US00RE47895E

(19) United States
(12) Reissued Patent
Fischer et al.

(10) Patent Number: US RE47,895 E
(45) Date of Reissued Patent: Mar. 3, 2020

(54) METHOD OF ALLOCATING ACCESS RIGHTS TO A TELECOMMUNICATIONS CHANNEL TO SUBSCRIBER STATIONS OF A TELECOMMUNICATIONS NETWORK AND SUBSCRIBER STATION

(71) Applicant: IPCom GmbH & Co. KG, Pullach (DE)

(72) Inventors: Ralf Fischer, Diekholzen (DE); Martin Hans, Bad Salzdetfurth (DE); Frank Kowalewski, Göttingen (DE); Josef Laumen, Neufahrn (DE); Gunnar Schmidt, Bliestorf (DE); Detlef Lechner, Berlin-Tempelhof (DE); Holger Schulz, Berlin (DE)

(73) Assignee: IPCom GmbH & Co. KG, Pullach (DE)

(21) Appl. No.: 15/014,825

(22) Filed: Feb. 3, 2016

Related U.S. Patent Documents

Reissue of:
(64) Patent No.: 7,043,751
Issued: May 9, 2006
Appl. No.: 09/914,967
PCT Filed: Feb. 15, 2000
PCT No.: PCT/DE00/00431
§ 371 (c)(1),
(2) Date: Sep. 6, 2001
PCT Pub. No.: WO00/54534
PCT Pub. Date: Sep. 14, 2000

(30) Foreign Application Priority Data

Mar. 8, 1999 (DE) ..... 199 10 239

(51) Int. Cl.
*G06F 7/04* (2006.01)
*H04M 3/42* (2006.01)
(Continued)

(52) U.S. Cl.
CPC ..... *H04M 3/4228* (2013.01); *H04W 72/10* (2013.01); *H04W 12/08* (2013.01); *H04W 72/14* (2013.01); *H04W 74/08* (2013.01)

(58) Field of Classification Search
CPC ... H04M 3/4228; H04W 12/08; H04W 72/14; H04W 72/10; H04W 74/08
See application file for complete search history.

(56) References Cited

U.S. PATENT DOCUMENTS 4,545,049 A * 10/1985 Kammerer et al. ..... 370/225
4,583,217 A 4/1986 Kittel
(Continued)

FOREIGN PATENT DOCUMENTS

DE 19712047 9/1998
DE 198 38 832 A1 3/2000
(Continued)

OTHER PUBLICATIONS

SMG3 management team, Status report of SMG3 to SMG#27, Oct. 1998.
(Continued)

*Primary Examiner* — William H. Wood
(74) *Attorney, Agent, or Firm* — Kilpatrick Townsend & Stockton LLP

(57) ABSTRACT

A method and a subscriber station for allocating rights of access to a telecommunications channel of the telecommunications network to at least one subscriber station (5, 10, 15, 20) are proposed in which information signals are transmitted to the at least one subscriber station (5, 10, 15, 20). With the information signals, access authorization data (45, 50, 55) are transmitted to the at least one subscriber station (5, 10, 15, 20). Upon reception of the access authorization data (45, 50, 55) in an evaluation unit (6) of the at least one subscriber station (5, 10, 15, 20), the question is asked whether the access authorization data (45, 50, 55)
(Continued)

include an access threshold value (S), and the access threshold value (S) is compared with a random number or a pseudo-random number (R), and the right of access to a telecommunications channel of the at least one subscriber station (5, 10, 15, 20) is granted as a function of the outcome of comparison.

10 Claims, 3 Drawing Sheets

(51) Int. Cl.

| | |
|---|---|
| ***H04W 72/10*** | (2009.01) |
| *H04W 72/14* | (2009.01) |
| *H04W 12/08* | (2009.01) |
| *H04W 74/08* | (2009.01) |

(56) References Cited

U.S. PATENT DOCUMENTS

| | | | | |
|---|---|---|---|---|
| 4,611,320 | A * | 9/1986 | Southard | 370/241 |
| 4,625,308 | A | 11/1986 | Kim et al. | |
| 4,707,832 | A | 11/1987 | Glenn | |
| 4,777,331 | A * | 10/1988 | Borst | 178/120 |
| 4,788,543 | A | 11/1988 | Rubin | |
| 4,866,788 | A | 9/1989 | Mouly et al. | |
| 4,881,074 | A * | 11/1989 | Reichbauer et al. | 370/258 |
| 4,903,280 | A * | 2/1990 | Lang et al. | 375/220 |
| 4,955,082 | A | 9/1990 | Hattori et al. | |
| 4,979,168 | A | 12/1990 | Courtois et al. | |
| 4,987,571 | A | 1/1991 | Haymond et al. | |
| 5,101,501 | A | 3/1992 | Gilhousen et al. | |
| 5,142,533 | A | 8/1992 | Crisler et al. | |
| 5,175,537 | A | 12/1992 | Jaffe et al. | |
| 5,222,248 | A | 6/1993 | McDonald et al. | |
| 5,327,577 | A | 7/1994 | Uddenfeldt | |
| 5,355,516 | A | 10/1994 | Herold et al. | |
| 5,402,471 | A | 3/1995 | Van Nielen | |
| 5,404,355 | A | 3/1995 | Raith | |
| 5,410,737 | A * | 4/1995 | Jones | 455/454 |
| 5,420,861 | A | 5/1995 | De La | |
| 5,434,847 | A | 7/1995 | Kou | |
| 5,479,409 | A | 12/1995 | Dupuy et al. | |
| 5,487,071 | A | 1/1996 | Nordstrand et al. | |
| 5,490,087 | A | 2/1996 | Redden et al. | |
| 5,507,006 | A | 4/1996 | Knight | |
| 5,513,380 | A | 4/1996 | Ivanov et al. | |
| 5,561,844 | A | 10/1996 | Jayapalan et al. | |
| 5,583,869 | A | 12/1996 | Grube et al. | |
| 5,590,133 | A | 12/1996 | Billstrom et al. | |
| 5,640,414 | A | 6/1997 | Blakeney, II et al. | |
| 5,678,185 | A | 10/1997 | Chia | |
| 5,682,601 | A | 10/1997 | Sasuta | |
| 5,706,274 | A | 1/1998 | Angelico et al. | |
| 5,711,003 | A | 1/1998 | Dupuy | |
| 5,729,542 | A | 3/1998 | Dupont | |
| 5,742,592 | A | 4/1998 | Scholefield et al. | |
| 5,752,164 | A * | 5/1998 | Jones | 455/454 |
| 5,752,193 | A | 5/1998 | Scholefield et al. | |
| 5,761,431 | A | 6/1998 | Gross et al. | |
| 5,778,318 | A | 7/1998 | Talarmo et al. | |
| 5,790,528 | A | 8/1998 | Muszynski | |
| 5,794,149 | A | 8/1998 | Hoo | |
| 5,822,313 | A | 10/1998 | Malek et al. | |
| 5,839,071 | A | 11/1998 | Johnson | |
| 5,862,452 | A | 1/1999 | Cudak et al. | |
| 5,884,175 | A | 3/1999 | Schiefer et al. | |
| 5,909,469 | A | 6/1999 | Frodigh et al. | |
| 5,913,167 | A | 6/1999 | Bonta et al. | |
| 5,930,711 | A | 7/1999 | Kim et al. | |
| 5,940,761 | A | 8/1999 | Tiedemann, Jr. et al. | |
| 5,940,762 | A | 8/1999 | Lee et al. | |
| 5,949,774 | A | 9/1999 | Seekins et al. | |
| 5,991,626 | A | 11/1999 | Hinz et al. | |
| 5,999,816 | A | 12/1999 | Tiedemann, Jr. et al. | |
| 6,009,328 | A | 12/1999 | Muszynski | |
| 6,014,429 | A | 1/2000 | LaPorta et al. | |
| 6,026,300 | A | 2/2000 | Hicks | |
| 6,038,213 | A * | 3/2000 | Albrow et al. | 370/229 |
| 6,038,449 | A | 3/2000 | Corriveau et al. | |
| 6,055,427 | A | 4/2000 | Ojaniemi | |
| 6,067,291 | A | 5/2000 | Kamerman et al. | |
| 6,078,568 | A | 6/2000 | Wright et al. | |
| 6,078,572 | A | 6/2000 | Tanno et al. | |
| 6,078,813 | A | 6/2000 | Ljung | |
| 6,088,590 | A | 7/2000 | Anderson et al. | |
| 6,097,951 | A | 8/2000 | Ernam et al. | |
| 6,112,101 | A | 8/2000 | Bhatia et al. | |
| 6,118,788 | A | 9/2000 | Kermani et al. | |
| 6,122,512 | A | 9/2000 | Bodin | |
| 6,131,030 | A | 10/2000 | Schon et al. | |
| 6,160,999 | A | 12/2000 | Chheda et al. | |
| 6,167,279 | A | 12/2000 | Chang et al. | |
| 6,195,327 | B1 | 2/2001 | Lysejko et al. | |
| 6,195,338 | B1 | 2/2001 | Decker | |
| 6,205,128 | B1 | 3/2001 | Le | |
| 6,226,279 | B1 | 5/2001 | Hansson et al. | |
| 6,230,313 | B1 | 5/2001 | Callahan, II et al. | |
| 6,252,860 | B1 | 6/2001 | Pillekamp | |
| 6,256,501 | B1 | 7/2001 | Tokuyama et al. | |
| 6,259,683 | B1 | 7/2001 | Sekine et al. | |
| 6,266,527 | B1 | 7/2001 | Mintz | |
| 6,272,117 | B1 | 8/2001 | Choi et al. | |
| 6,275,406 | B1 | 8/2001 | Gibson et al. | |
| 6,275,506 | B1 * | 8/2001 | Fazel et al. | 370/478 |
| 6,278,881 | B1 | 8/2001 | Balck | |
| 6,295,451 | B1 | 9/2001 | Mimura | |
| 6,301,242 | B1 | 10/2001 | Lindsay et al. | |
| 6,304,755 | B1 | 10/2001 | Tiedemann, Jr. et al. | |
| 6,311,065 | B1 | 10/2001 | Ushiki et al. | |
| 6,374,099 | B1 | 4/2002 | Bi et al. | |
| 6,381,235 | B1 | 4/2002 | Kamel et al. | |
| 6,400,695 | B1 | 6/2002 | Chuah et al. | |
| 6,434,223 | B2 * | 8/2002 | Katz | 379/93.13 |
| 6,469,991 | B1 * | 10/2002 | Chuah | 370/329 |
| 6,477,375 | B1 * | 11/2002 | Ho et al. | 455/445 |
| 6,493,555 | B2 | 12/2002 | Saada et al. | |
| 6,549,778 | B1 | 4/2003 | Mulford | |
| 6,609,003 | B1 | 8/2003 | Park et al. | |
| 6,625,127 | B1 * | 9/2003 | Klas et al. | 370/310 |
| 6,628,630 | B1 | 9/2003 | Nagase | |
| 6,826,414 | B1 | 11/2004 | Reynolds et al. | |
| 6,879,830 | B1 | 4/2005 | Vollmer et al. | |
| 6,978,142 | B2 | 12/2005 | Jokimies | |
| 7,043,751 | B1 | 5/2006 | Fischer et al. | |
| 8,195,238 | B2 | 6/2012 | Ofuji et al. | |

FOREIGN PATENT DOCUMENTS

| | | |
|---|---|---|
| DE | 19900436 | 7/2000 |
| DE | 199 10 239 A1 | 9/2000 |
| DE | 20024006 | 4/2009 |
| DE | 20024007 | 5/2009 |
| DK | 1018849 | 7/2007 |
| DK | 1560454 | 12/2007 |
| EP | 0369535 | 5/1990 |
| EP | 0454266 | 10/1991 |
| EP | 0540808 | 5/1993 |
| EP | 0652680 | 5/1995 |
| EP | 0 690 638 A2 | 1/1996 |
| EP | 0699011 | 2/1996 |
| EP | 0 765 096 A2 | 3/1997 |
| EP | 0765096 | 3/1997 |
| EP | 0818938 | 1/1998 |
| EP | 0852102 | 7/1998 |
| EP | 1018849 | 7/2000 |
| EP | 1033846 | 9/2000 |
| EP | 0658014 | 2/2003 |
| EP | 0940056 | 7/2003 |
| EP | 1 186 189 B1 | 5/2007 |
| EP | 1560454 | 8/2007 |
| EP | 1 841 268 A2 | 10/2007 |
| EP | 1863315 | 12/2007 |

(56) References Cited

FOREIGN PATENT DOCUMENTS

| | | | |
|---|---|---|---|
| EP | 1 841 268 | B1 | 3/2010 |
| EP | 2 309 815 | A1 | 4/2011 |
| EP | 2 194 750 | B1 | 6/2011 |
| EP | 2 309 815 | B1 | 8/2012 |
| EP | 2 200 389 | B1 | 12/2012 |
| JP | 64029136 | | 1/1989 |
| JP | S64-29136 | A | 1/1989 |
| JP | H04-373325 | A | 12/1992 |
| JP | 7222246 | | 8/1995 |
| JP | H07-202896 | A | 8/1995 |
| JP | H07-203549 | A | 8/1995 |
| JP | H08-47032 | A | 2/1996 |
| JP | H09-507624 | A | 7/1997 |
| JP | H10-94017 | A | 4/1998 |
| JP | H10-136021 | A | 5/1998 |
| JP | 10178462 | | 6/1998 |
| JP | H10-505968 | A | 6/1998 |
| JP | H10-243467 | A | 9/1998 |
| JP | H10-512432 | A | 11/1998 |
| JP | H10-327474 | A | 12/1998 |
| JP | 11017607 | | 1/1999 |
| JP | H11-55179 | A | 2/1999 |
| JP | 2002539693 | | 11/2002 |
| JP | 4373325 | | 11/2009 |
| WO | 91 15069 | A | 10/1991 |
| WO | 91/15069 | A1 | 10/1991 |
| WO | 9115069 | | 10/1991 |
| WO | 9301860 | | 2/1993 |
| WO | 9318601 | | 9/1993 |
| WO | 96/08939 | A1 | 3/1996 |
| WO | 9608939 | | 3/1996 |
| WO | 9625015 | | 8/1996 |
| WO | 97/09836 | A1 | 3/1997 |
| WO | 9709836 | | 3/1997 |
| WO | 9711570 | | 3/1997 |
| WO | 9715160 | | 4/1997 |
| WO | 9715163 | | 4/1997 |
| WO | 97/16931 | A1 | 5/1997 |
| WO | 97 19525 | A | 5/1997 |
| WO | 97/19525 | A1 | 5/1997 |
| WO | 9723110 | | 6/1997 |
| WO | 9731495 | | 8/1997 |
| WO | 9734429 | | 9/1997 |
| WO | 9740605 | | 10/1997 |
| WO | 9748249 | | 10/1997 |
| WO | 98/02008 | A2 | 1/1998 |
| WO | 9803031 | | 1/1998 |
| WO | 9804094 | | 1/1998 |
| WO | 98/23109 | A2 | 5/1998 |
| WO | 9831176 | | 7/1998 |
| WO | 9832262 | | 7/1998 |
| WO | 98/37668 | A1 | 8/1998 |
| WO | 9836607 | | 8/1998 |
| WO | 9917582 | | 4/1999 |
| WO | 9931920 | | 6/1999 |
| WO | 99/44379 | A1 | 9/1999 |
| WO | 00/54534 | A1 | 9/2000 |

OTHER PUBLICATIONS

SMG2, Concept Group Alpha—Wideband Direct-Sequence CDMA (WCDMA), Evaluation Document (3.0), ETSI SMG Meeting No. 24, Madrid, Spain, Dec. 15-19, 1997.

PT SMG, PT SMG Status Report (STF 12. STF 83, STF 80V, STF 61V, STF 137, STF 138, STF 139) Draft for SMG #28 approval, SMG#28, Plenary Meeting, Milano, Italy, Feb. 8-12, 1999.

SMG2-WPA, Persistence control procedure modifications, Sep. 8, 1998.

Bosch, Proposal for RACH Access Control in UTRAN, ETSI UMTS L23 Expert Group Meeting, Helsinki, Finland, Sep. 1-4, 1998.

L23 Expert Group/Editor, UMTS YY.01, UE-UTRAN Radio Interface Protocol Architecture; Stage 2, Sophia Antipolis, France, Dec. 9-11, 1998.

ETSI SMG2 UMTS L23 Expert Group, "Mechanisms for managing uplink interference and bandwidth", Dec. 9-11, 1998.

Draft report of the 1st WG1 meeting, Espoo, Finland, Jan. 21-22, 1999 (Exhibit N).

TIA/EIA Telecommunications Systems Bulletin, Assignment of Access Overload Classes in the Cellular Telecommunications Services, Mar. 1985.

TIA/TEA Interim Standard, Mobile Station-Base Station Compatibility Standard for Dual-Mode Wideband Spread Spectrum Cellular System, TIA/EIA/IS-95, Jul. 1993.

TIA/TEA Interim Standard, Mobile Station-Base Station Compatibility Standard for Dual-Mode Wideband Spread Spectrum Cellular System, TIA/EIA/IS-95, pp. 1-9, 2-12, 2-41, 2-42, 3-8, 3-9, 3-33, Jul. 1991.

TR 45 Mobile Station-Base Station Compatibility Standard for Dual-Mode Spread Spectrum Systems, SP-3693-1 (10 be published as TIAIEIA-95-B), Oct. 31, 1998.

TS 25.214 v1.0.0, UTRA FDD; Physical layer procedures, Apr. 1999.

TS 25.321 V2.0.0, 3rd Generation Partnership Project (3GPP); Technical Specification Group (TSG) RAN; Working Group 2 (WG2); MAC protocol specification, Apr. 1999.

TS 100 921 v6.0.0, Digital cellular telecommunications system (Phase 2+); Service accessibility (GSM 02.11 version 6.0.0 Release 1997), Jul. 1998.

TS 100 940 V6.1.1, Digital cellular telecommunications system (Phase 2+); Mobile radio interface layer 3 specification (GSM 04.08 version 6.1.1 Release 1997), Aug. 1998.

TSG-RAN Working Group1 meeting #2; Physical layer procedures (FDD), Yokohama, Feb. 22-25, 1999.

TSG-RAN Working Group 2 (Radio layer 2 and Radio layer 3), 3GPP S2.21 v002: MAC protocol specification, Stockholm, Mar. 8-11, 1999.

TSG-RAN Working Group 2 (Radio layer 2 and Radio layer 3), RACH Prioritisation Scheme for Multi-service Provision, Stockholm, Mar. 8-11, 1999.

TSG-RAN Working Group 2 (Radio layer 2 and Radio layer 3), RACH Admission Control, Stockholm, Mar. 8-11, 1999.

TSG-RAN Working Group 2 (Radio layer 2 and Radio layer 3), MAC Tasks in the Random Access Procedure, Berlin, May 25-28, 1999.

TSG-RAN Working Group2 meeting#4, "Dynamic Persistance for Random Access", Berlin, Germany, May 25-28, 1999.

TSG-RAN Working Group 2 (Radio layer 2 and Radio layer 3), approved minutes of WG2 meeting #4 (Berlin May 25-28, 1999, v 1.0), Sophia Antipolis, Jul. 5-9, 1999.

TSG-RAN Working Group 2 (Radio layer 2 and Radio layer 3), Proposed CR 236 to TS25.331 on Application of Access Service Classes and relation to Access Classes, Turin, Italy, Feb. 28-Mar. 3, 2000.

TSG-RAN WG2 meeting #12, Approved Report of the 11tth TSG-RAN meeting, Seoul, Korea, Apr. 10-13, 2000.

TSG-Terminals Working Group (USIM) meeting #2, PDC SIM Specification, Munich, Feb. 17-19, 1999.

L1EG, Limiting Access on a Heavily Loaded CCCH, Copenhagen, Aug. 31-Sep. 4, 1987.

Minutes of the WPI Meeting in Copenhagen, Aug. 31-Sep. 4, 1987.

Draft Report of GSM WP3 meeting, Munich, Sep. 14-18, 1987.

Minutes of the L1EG meeting, Aug. 31-Sep. 2, 1987.

Xiaoping He, R. Tafazolli, and B. Evans. "An optimised signalling architecture for a MEO/ICO satellite system", 16th International Communications Satellite Systems Conference, International Communications Satellite Systems conference, Washington, D.C., Feb. 25-29, 1996.

3GPP TS 25.331 V6.16.0, Dec. 2007, 1253 pages.

Judgment Approved by the court for handing down, Nokia v IPCom, 9 pages.

3GPP TS 25.331 V6.17.0, Mar. 2008, 1 page.

Third Generation Mobile Communications: The way Forward for IPR, 3GPP/PCG Meeting #1, ETSI, Mar. 1999, 37 pages.

3rd Generation Partnership Project (3GPP); Technical Specification Group (TSG) RAN; Working Group 2 (WG2), RRC Protocol Specification, TS 25.331 v1.0.0, Apr. 1999, 74 pages.

(56) References Cited

OTHER PUBLICATIONS

3rd Generation Partnership Project; Technical Specification Group Radio Access Network; Medium Access Control (MAC) protocol specification, 3GPP TS 25.321 v8.3.0, Sep. 2008, 9 pages.
3rd Generation Partnership Project; Technical Specification Group Radio Access Network; Physical layer procedures (FDD), 3GPP TS 25.214 V8.3.0, Sep. 2008, 44 pages.
3rd Generation Partnership Project; Technical Specification Group Radio Access Network; RRC Protocol Specification, 3GPP TS 25.331 v3.5.0, (Release 1999), Dec. 2000, 41 pages.
3rd Generation Partnership Project; Technical Specification Group Radio Access Network; RRC Protocol Specification, 3G TS 25.331 V3.2.0, (Release 1999), Mar. 2000, pp. 1-506.
3rd Generation Partnership Project; Technical Specification Group Radio Access Network; UTRAN overall description, 3GPP TS 25.401 V8.2.0, Release 8, Dec. 2008, 53 pages.
3rd Generation Partnership Project; Technical Specification Group Services and System Aspects; Service accessibility, Release 1999, 3GPP TS 22.011 v3.3.0, Oct. 2000, 14 pages.
A Proposal for the Design of the Random Access Protocol on the CCCH, GSM/LIEG, L1EG 74/87, Stockholm, Aug. 31, 1987, pp. 1-5.
Access Control to PLMN in State of Emergency, GSM 02.11 V3.0.0, 6 pages.
Affidavit of Marie-Bernadette Pautet, Section 5.2, Anlage K76, Feb. 3, 2012, 3 pages.
Affidavit of Michel Mouly, ANLAGE D40, EP 1841268, Feb. 14, 2012, 5 pages.
Analysis of Patents Declared as Essential to GSM as of Jun. 6, 2007, Fairfield Resources International, Dec. 31, 2007, 13 pages.
Analysis of Patents Declared as Essential to WCDMA as of Dec. 31, 2005, Fairfield Resources International, Anlage B 33, Nov. 21, 2007, 18 pages.
Annex A of Expert Report of Dr. David Edward Cooper—In the High Court of Justice Chancery Division Patent Court, Analysis—Encoding and Decoding of Messages According to pre-Mar. 1999 GSM Standards, Sep. 25, 2009, pp. 109-129.
Annex B to Expert Report of Dr. David Edward Cooper—In the High Court of Justice Chancery Division Patent Court, Brief Analysis of the Cited Prior Art Patents-, Sep. 25, 2009, pp. 130-149.
Annex C Expert Report of Dr. David Edward Cooper—In the High Court of Justice Chancery Division Patent Court, Data Representation in the UMTS, Sep. 25, 2009, pp. 150-154.
Appendix B Operation of the Mobile Station When Switching to the Standby State, Nokia/IPCom RCR STD-27G, pp. 865-876.
Approved Judgment, case No. A3/2010/0454/0939/2678,Nokia GmbH/Nokia UK Ltd. and IPCom GmbH & Co. KG, In the High Court of Justice Court of Appeal (Civil Division), Jan. 20, 2011, 32 pages.
Approved Judgment, Nokia GmbH and IPCOM GmbH & Co. KG and between: IPCOM GmbH & Co. KG and Nokia UK ltd., Nokia OYJ, Case #s HC 08C02525 & HC 08C03143, Jan. 18, 2010, 67 pages.
Approved Report of the 11tth TSG-RAN meeting, TSG-RAN WG2 meeting #12, Apr. 2000, 70 pages.
Broadband Radio Access Networks (BRAN); High Performance Radio Local Area Network (HIPERLAN) Type 1; Functional Specification, EN 300 652, V1.2.1, Jul. 1998, 105 pages.
CCH Guidelines for Industry Participation in Technical Harmonization Work in Working Groups and Sub-Working Groups, CEPT, T/CCH/SP, doc. t/cch (87) 2, Jan. 29, 1987, 2 pages.
CEPT/CCH/GSM/L1EG, Minutes of the LIEG (handwritten), Aug. 31, 1987, 23 pages.
CEPT/CCH-GSM, Report From Meeting #13,GSM Doc 82/87,, Feb. 16, 1987, 17 pages.
CEPT/CCH-GSM, Report from Meeting #14, GSM Doc 117/87, Jun. 9, 1987, 18 pages.
CEPT/CCH-GSM, Report from Meeting #9, GSM Doc 22/86, Sep. 30, 1985, 18 pages.
Certificate—National Diet Library Kansai Building 100104004-7-7 -, Certificate Relating to Library Material Stocked at National Diet Library, Mar. 24, 2010, 2 pages.
Certificate—National Diet Library Kansai Building 100104004-7-8-, Certificate Relating to Library Material Stocked at National Diet Library, Mar. 24, 2010, 2 pages.
Change Request 25.321 Cr079r1, 3GPP RAN WG2#11, Version 3.2.0, Mar. 3, 2000, 8 pages.
Change Request (Phase 1) No. 3, ETSI TC GSM Meeting No. 29, Jan. 1991, 4 pages.
Change Request No. A094 rev1, Technical Specification GSM 04.60 v.6.1.0, Sep. 1998, 15 pages.
Change Request No. A273r3, GSM 04.08 version 5.7.0, ETSI STC SMG2, SMG2 WPA, Oct. 1997, 42 pages.
Chapter 2 Outline of the System, RCR STD—32A, 8 pages.
Commission of the European Communities, EN 06 Documents, Catalorue number: CB-00-92-471-EN-C, COM (92) 445 final, Oct. 1992, 33 pages.
Communication from the Federal Patent Court of Germany, *Nokia Corporation et al* v. *IPCom GmbH & Co. KG*, Apr. 8, 2010, 4 pages.
Conference for the Presentation of the GSM System, Federal Republic of Germany and France, Apr. 26, 1988, 6 pages.
Confidential Expert Report of Izzat Zuhair Darwazeh—In the High Court of Justice Chancery Division, IPCom GmbH & Co KG and (1) Nokia UK Limited (2) Nokia Oyj (Nokia Corporation) Nokia GmbH and IPCom GmbH & Co KG (at least as early as Apr. 1, 2010), Apr. 1, 2010, pp. 1-29, missing pp. 8-22.
Covering Note to Recommendation, GSM 05.08 V2.1.0, WP2, Feb. 1988, 27 pages.
CRs to 04.07, 04.08, 04.64, 04.65 and 9.18 on GPRS, Tdoc SMG 677/98, SMG Meeting #27, Praha, Oct. 12, 1998, pp. 1-21.
Dichiarazione Del Dr. Paolo Usai, (Translation currently unavailable), Sep. 29, 2009, 2 pages.
Digital cellular telecommunications system (Phase 2); Mobile-services Switching Centre—Base Station System (Msc-BSS) interface; Layer 3 specification, ETS 300 590, GSM 08.08 version 4.12.1, Sixth Edition, Oct. 1998, 19 pages.
Digital Cellular Telecommunications System (Phase 2); Radio Subsystem Link Control, GSM 05.08 V4.17.0, May 1996, 37 pages.
Digital Cellular Telecommunications System (Phase 2); Service accessibility (GSM 02.11), ETS 300 507, ETSI TC-SMG, GSM, Second Edition, Jan. 1996, 15 pages.
Digital Cellular Telecommunications System (Phase 2+); Base Station Controller • Base Transceiver Station (BSC • BTS) interface; Layer 3 specification, ETSI, GSM 08.58 version 5.8.0 Release 1996, Jul. 1998, 22 pages.
Digital Cellular Telecommunications System (Phase 2+); General Packet Radio Service (GPRS); Mobile Station (MS)—Base Station System (BSS) Interface; Radio Link Control/Medium Access Control (RLC/MAC) Protocol, Draft EN 301 349 V6.1.0, Aug. 1998, 152 pages.
Digital Cellular Telecommunications System (Phase 2+); General Packet Radio Service (GPRS); Mobile Station (MS)—Base Station System (BSS) interface; Radio Link Control/Medium Access Control (RLC/MAC) Protocol, ETSI, (GSM 04.60 Version 6.0.0), EN (04.60) V6.0.0, Mar. 1998, 69 pages.
Digital Cellular Telecommunications System (Phase 2+); General Packet Radio Service (GPRS); Mobile Station (MS)—Base Station System (BSS) Interface; Radio Link Control/Medium Access Control (RLC/MAC) Protocol, EN 301 349 V6.3.1,(GSM 04.60 version 6.3.1 release 1997, Jun. 1999, pp. 1-8, 29, 58-59.
Digital Cellular Telecommunications System (Phase 2+); Mobile Radio Interface Layer 3 Specification, (GSM 04.08 version 6.2.0 release 1997), Draft EN 300 940 V6.2.0, Dec. 1998, 118 pages.
Digital Cellular Telecommunications System (Phase 2+), Specification of the Subscriber Identity Module Mobile Equipment (SIM-ME) interface, ETS 300 977, GSM 11.11 version 5.10.1 Release 1996, Dec. 1998, 125 pages.
Digital Cellular Telecommunications System (Phase 2+); Mobile radio interface signaling layer 3; General aspects, TS 100 939 V6.2.0, GSM 04.07 version 6.2.0 Release 1997, Oct. 1998, 118 pages.

(56) References Cited

OTHER PUBLICATIONS

Digital Cellular Telecommunications System (Phase 2+}; Subscriber Identity Modules (SIM}; Functional Characteristics, TS 100 922, GSM 02.17 version 6.0.0 Release 1997, European Telecommunications Standards Institute, Nov. 1998, 14 pages.
Digital Cellular Telecommunications System (Phase 2); Radio Subsystem Link Control, GSM 05.08 V4.15.0, May 1996, 36 pages.
Distribution of Updated GSM Recommendations, ETSI, From ETSI to GSM Delegations, Feb. 12, 1991, 2 pages.
District Court of Mannheim, Decision, 7th Civil Chamber, Germany, Dec. 3, 2010, 66 pages.
Document List of ETSI/TC GSM Meeting No. 29, GSM, Jan. 1991, 8 pages.
Draft Minutes of the 3GPP TSG-RAN WG2 Meeting #2, 3GPP TSG-RAN Working Group 2, Tdoc TSG-RAN WG2 198/99, Secretary 3GPP TSG-RAN Working Group 2 (NEC Technologies UK), Apr. 13, 1999, 27 pages.
EPO Decision to Grant—EP07009265.5 (K49), European Patent Office, Feb. 18, 2010, 6 pages.
ESTI Guide on IPRs, ETSI Guide on Intellectual Property Rights (IPRs), Version endorsed by Board #60, Jan. 25, 2007, 22 pages.
ETS 300 507—GSM—Digital Cellular Telecommunications Systems (Phase 2); Service Accessibility, (GSM 02.11), Fourth Edition, Sep. 1996, 3 pages.
ETSI/FC17 (96)05—17th Finance Committee Meeting, Sophia Antipolis, Mar. 7, 1996, 3 pages.
ETSI/TC/SMG 327 Meeting Disk, Oct. 1998, 1 page.
GSM action plan, GSM (editor: F. Hillebrand, Federal Republic of Germany), CEPT/CCH/GSM, Oct. 3, 1986, 21 pages.
GSM and SMG Plenary Meetings 1-32, 4 pages.
GSM Meeting Report, ETSI Meeting No. 29, Jan. 1991, 24 pages.
GSM Recommendation 05.01 (version 3.3.2) Physical Layer on the Radio Path, (at least as early as Jan. 1, 2004), Jan. 1, 2004, pp. 1-11.
Handover, High Tech Computer Corp., Aug. 4, 2009, pp. 247-260.
Heads of Delegation Meeting, Oct. 6, 1987, 2 pages.
HTC's Reply ISO Motion for Summary Judgment—Claim 13 of the '751 Patent, *HTC Corporation, et al.* v. *IPCOM GmbH & Co., KG*, United States District Court of the District of Columbia, Civil Action No. 1 :08-cv-01897 (RMC), Aug. 17, 2011, pp. 1-27.
In the Patent Annulment Proceedings, Federal Patent Court in the Name of the People Decision, Dec. 1, 2010, 37 pages.
Index of FTP Specs archive, Index of /ftp/Specs/archive/04_series/04.60, 2009, 1 page.
Index of FTP Specs Archive, Index of /ftp/Specs/archive/04_series/04.08, 2009, 2 pages.
Integrated Dispatch Radio System ARIB Standard, RCR STD-32A, Fascicle 1, Association of Radio Industries and Businesses (ARIB), Mar. 17, 1993, 23 pages.
Konkordanzliste STD-27G, (at least as early as Jan. 2010), Jan. 2010, 1 page.
LAN Set-Up at SMG #30 for Electronic Working, ETSI/TC/SMG#30,ETSI MCC, Tdoc P-99-643, Nov. 1999, 6 pages.
Layer 1 Aspects of Call Management, GSM 05.08 V00.05.01, Sep. 4, 1987, 18 pages.
List of Change Requests and New Specifications Presented to SMG #26, ETSI SMG #26, Annex 2, Jul. 20, 1998, 14 pages.
List of Participants to ETSI/TC/SMG #27, Nov. 3, 1998, 37 pages.
Maintenance of GSM Recommendations: Change-Request Procedure, CEPT/CCH/GSM, Jun. 23, 1988, 5 pages.
Memo Opinion on Motions for Reconsideration of Claims Construction, Case 1 :08-cv-01897-RMC , Document 224, Nov. 23, 2010, 18 pages.
Memorandum Opinion on Claim Construction, *HTC Corporation et al* v. *IPCom GmbH & Co., KG*; United States District Court for the District of Columbia; CA No. 08-1897 (RMC), Aug. 25, 2010, 50 pages.
Minutes of the 10th Layer 1 Experts Group Meeting, TDOC SMG2 L1 Rev. 1, ETSI SMG2 UMTS LI Expet1s Group, Espoo, Jan. 18-22, 1999, Jan. 25, 1999, 21 pages.
Minutes of the L1EG Meeting, CEPT/CCH/GSM/L1EG-, Aug. 31, 1987, 10 pages.
Notice from the European Patent Office concerning internet citations, The Official Journal EPO, Issue 8-9, Aug./Sep. 2009, pp. 456-462.
Opinion of Dr. Laurent Aynes, Anlage B 52, IP-Com .f. NOKIA, Jun. 19, 2008, 32 pages.
Order, *HTC Corporation et al* v. *IPCom GmbH & Co., KG*; United States District Court for the District of Columbia; CA No. 08-1897(RMC), Aug. 25, 2010, 5 pages.
Order in the High Court of Justice Chancery Division Patents Court—UK, Nokia GmbH and IPCom GmbH & Co. KG and IPCom GmbH & Co. KG and (1) Nokia UK Limited (2) Nokia Oyj (Nokia Corporation), Feb. 12, 2010, 8 pages.
Order in the High Court of Justice Chancery Division Patents Court—UK, Nokia GmbH and IPCom GmbH; IPCom GmbH & Co KG and (1) Nokia UK Limited (2) Nokia OYJ (Nokia Corporation), Mar. 31, 2010, 10 pages.
Personal Digital Cellular Telecommunication System ARIB Standard, 1 page.
Portal.Etsi.Org, /docbox/zArchive/SMG/SMG/plenary/27_9810_Prague/tdocs/, 3 pages.
Proposed Change Request No. GSM 04.08 Version 5.50, pp. 1-28.
Radio equipment and Systems (RES); Digital Enhanced Cordless Telecommunications (DECT); Common Interface (CI); Part 6: Identities and Addressing, ETS 300 175-6, ETSI TC-RES, Second Edition, Sep. 1996, 42 pages.
Radio Sub-System Aspects of Call Management, GSM 05.08 V01.02.00, Nov. 13, 1987, 25 pages.
Radio Subsystem Link Control, GSM 05.08 V3.8.0, Dec. 1995, 39 pages.
Radio Sub-System Link Control, GSM 05.08 V3.0.0, ETSI/TCGSM, ETSI/PT 12, Recommendation GSM 05.08-DCS, Jan. 21, 1991, 2 pages.
Radio Sub-System Link Control, GSM 05.08 V3.1.2, Nov. 15, 1988, 2 pages.
Radio Sub-system Link Control, GSM 05.08 V3.0.0,GSM/PN, Feb. 15, 1988, 27 pages.
Radio Sub-System Link Control, GSM 05.08 V4.0.0, Oct. 1991, 31 pages.
Radio sub-system link control, GSM 05.08, Version: 4.2.0, Jun. 1992, 32 pages.
Radio Sub-System Link Control, GSM 05.08 V3.32.0, Oct. 1989, 35 pages.
Radio Sub-System Link Control, GSM 05.08 V3.1.1, Oct. 20, 1988, 37 pages.
Radio Sub-System Link Control, GSM 05.08 V3.7.0, Feb. 1992, 38 pages.
Radio Sub-System Link Control, GSM 05.08 V3.7.0, Jan. 1991, 38 pages.
Radio Sub-System Link Control, GSM 05.08 V3.6.0, Nov. 1989, 45 pages.
Radio Sub-System Synchronisation, GSM 05.08 V3.4.0, Mar. 1990, 6 pages.
Relationship with External Organizations to CEPT, Annex 7, to doc. T/CCH (85)21, T (85)4, 4 pages.
Release Note GSM 5.0 Radio Sub-System Synchronisation, Recommendation GSM 05.10, ETSI/PT 12, Mar. 1990, 6 pages.
Release Note Radio Sub-System Link Control, GSM 05.08 V3.5.0, Jan. 1990, 38 pages.
Release Note Radio Sub-System Link Control, ETSI/GSM, GSM 05.08 V3.2.0, Apr. 15, 1989, 42 pages.
Release Note Recommendation GSM 5.02 Multiplexing and Multiple Access on the Radio Path, ETSI/PT 12, Jan. 1990, 19 pages.
Release Note to recommendation, GSM 06.31: Discontinuous Transmission (DTX) for Full Rate Speech Traffic Channels, version 3.00.00, ETSI/PT12, Apr. 15, 1989, 17 pages.
Report of the Ad Hoc Working Party (AHWP) on General Policy Questions, CEPT/GSM/AHWP, GSM Doc 126/85, Oct. 1985, 7 pages.
Service and Information Center, Expert Opinion, 2 pages.
SMG #27 CD-ROM Order Form, Oct. 1998, 1 page.
SMG #27 Temporary Document List, 9 pages.

(56) References Cited

OTHER PUBLICATIONS

Speech Processing Functions: General Description, Gsm Recommendation: 06.01, CEPT/CCH/GSM, Draft 1.0.0, Dec. 1, 1989, 6 pages.
Statement from Michel Mouly, Anlage K79, Nokia .1 IPCom, Feb. 4, 2012, 5 pages.
Status of CRs and New Specifications Presented to the Meeting, ETSI SMG Meeting #27, Oct. 1998, 14 pages.
Structure and Terms of Reference for the Permanent Nucleus in GSM, Annex B, 2 pages.
Submission to the Federal Patent Court in Germany, Action of nullity 5 NI 67/09 (EU) regarding European Patent 1186189, Mar. 10, 2010, 36 pages.
The Process of Proceeding From the GSM Recommendations to Specification—1987 Production of the Outline Specifications, 1987, 5 pages.
Third Witness Statement Richard Vary, In the High Court of Justice Chancery Division Patents Court Between Nokia OYJ and IPCOM GMBH & co., KG, Feb. 16, 2011, 6 pages.
TS 04 60 V1.0.0 (Draft)—Digital Cellular Telecommunications Packet (Phase 2+), GSM 04.60 V1.0.0, Nov. 1997, 16 pages.
UMTS Terrestrial Radio Access Network (UTRAN); UTRA FDD; Physical Layer Procedures, ETSI, (UMTS XX.07 version 1.3.1), UMTS xx.07 v1.3.1, to TSG RAN-99030, Feb. 1999, 19 pages.
Universal Mobile Telecommunications System (UMTS); Characteristics of the Universal Subscriber Identity Module (USIM) application, ETSI TS 131 102 v6.21.0, 3GPP TS 31.102 version 6.21.0 Release 6, Oct. 2008, 12 pages.
Witness Statement of Dr. Ansgar Bergmann, filed on behalf of Nokia GmbH, Nokia UK Limited and Nokia OYJ (Nokia Comoration) in the High Court of Justice, Chancery Division, Patents Court, Sep. 3, 2009, pp. 1-14.
Witness Statement of Eike Haase, Mar. 10, 2010, 15 pages.
Witness Statement of Friedhelm Hillebrand, filed on behalf of Nokia GmbH, Nokia UK Limited and Nokia OYJ {Nokia Corporation) in the High Court of Justice, Chancery Division, Patents Court, Sep. 3, 2009, pp. 1-29.
U.S. Appl. No. 09/914,967, Non-Final Office Action dated Jul. 14, 2005, 7 pages.
U.S. Appl. No. 09/914,967, Notice of Allowance dated Dec. 28, 2005, 4 pages.
U.S. Appl. No. 09/914,967, IDS filled on Feb. 3, 2011, Feb. 3, 2011, 55 pages.
U.S. Appl. No. 09/914,967, Memorandum Opinion on Motions for Reconsideration of Claims Construction, Case 1 :08-cv-01897-RMC, Document 224,Civil Action No. 08-1897 (RMC), Nov. 23, 2010, 18 pages.
Bhat et al., Baseline document for Wireless ATM CS1, ATM .Forum/98-0402, ATM Forum Technical Committee, Jul. 27-31, 1998, 72 pages.
Bolla et al., Analysis and Performance Comparison of the RRA-ISA Multiple Access Protocol for Packet Voice and Data Cellular Systems, Personal, Indoor and Mobile Radio Communications, 1995. PIMRC'95. Wireless: Merging onto the Information Super Highway, Sixth IEEE International Symposium on, Sep. 1995, pp. 378-382.
Cooper, Expert Report of Dr. David Cooper, filed on behalf of Nokia GmbH, Nokia UK Limited and Nokia OYJ (Nokia Corporation) in the High Court of Justice, Chancery Division, Patents Court, Sep. 25, 2009, pp. 1-89, 108.
D'Avella et al., An Adaptive MLSE Receiver for TDMA Digital Mobile Radio, IEEE Journal on Selected Areas in Communication, vol. 7, No. 1, Jan. 1989, pp. 122-129.
Epstein et al., Reservation Strategies for Multi-Media Traffic in a Wireless Environment, Vehicular Technology Conference, 1995 IEEE 45th, Jul. 1995, pp. 165-169.
He et al., Priority-Based Random Access Scheme for S-PCN, Electronics Letters, vol. 33, No. 1, Jan. 2, 1997, 2 pages.
Johnson et al., Inter-System Handover for Packet Switched Services, IEEE Xplore (at least as early as Jan. 23, 2010), 3G and Beyond, 2005 6th IEE International Conference, Nov. 2005, pp. 435-439.
Kallasvuo et al., Decision in Dusseldorf District Court in Civil Matter IPCom GmbH & Co. KG versus Olli-Pekka Kallasvuo et al, Jan. 22, 2010, 4 pages.
Kayama et al., Adaptive Control for Random Access Traffic in Mobile Radio Systems, IEEE Transactions on Vehicular Technology, vol. 42, No. 1, Feb. 1993, pp. 87-93.
Kim et al., Investigation of CDMA Air Interface and Protocols, ETRI Journal, vol. 19, No. 3, Oct. 1997, pp. 303-315.
Knuth, The Art of Computer Programming, vol. 2, Seminumerical Algorithms, Nov. 14, 1997, 8 pages.
Ko et al., Simple Prioritized Protocol for Multi-channel P-Persistent CSMA/CD Networks, International Journal of Electronics, vol. 70, No. 2, 1991, pp. 295-304.
Lever et al., Expert Report and Disclosure of Sir Jeremy Lever KCMG QC and Anneli Howard on Behalf of Respondents, C.A. No. 2330-N, Jan. 11, 2007, 43 pages.
Madisetti, Rebuttal Expert Report, *HTC* v. *IPCom, USDC District of Columbia*, Civil Action No. 1:08-cv-01897, Aug. 17, 2011, 173 pages.
Mouly, CSN.1 Specification version 2.0, 24 pages.
Narrainen et al., A Distributed Control Scheme for Call Admission in CDMA Cellular Networks, Military Communications Conference, 1996. MILCOM '96, Conference Proceedings, IEEE, 1996, pp. 384-388.
Niri et al., Cordless-cellular Network Integration for the 3rd Generation Personal Communication Systems, Personal Communications in the 21st Century (II) (Ref. No. 1998/242), IEE Colloquium, 1998, pp. 402-408.
International Application No. PCT/DE00/00431, International Preliminary Report on Patentability dated Jun. 15, 2001, 19 pages.
International Application No. PCT/DE00/00431, International Search Report dated Jul. 21, 2000, 3 pages.
Sampath et al., Access Control of Data in Integrated Voice/Data CDMA Systems; Benefits and Tradeoffs, IEEE Journal on Selected Areas in Communication, vol. 15, Issue 8, Oct. 1997, pp. 1511-1526.
Scourias, Dynamic Location Management and Activity-based Mobility Modelling for Cellular Networks, (unpublished Master's thesis, University of Waterloo), 1997, 145 pages.
Shin et al., Interference-Based Channel Assignment for DS-CDMA Cellular Systems, IEEE Transactions on Vehicular Technology, vol. 48, No. 1, Jan. 1999, pp. 233-239.
Snell, Introduction to Probability, 1989, 21 pages.
Thomas, Affidavit of Remi Thomas, ANLAGE D38, EP 1 841 268, Feb. 15, 2012, 4 pages.
Thomas, Some Remarks About L1EG 74/87 and WP3 138/87, Anlage K77, Nokia .1. IPCom, 35 w (pat) 413/11-Lo 1 91/09, Feb. 5, 2012, 5 pages.
Tobagi, Carrier Sense Multiple Access with Message-Based Priority Functions, IEEE Transactions on Communications, vol. 30, No. 1, Jan. 1982, pp. 185-200.
Walke, Mobilfunknetze und ihre Protokolle Band 1, Chapter 3 GSM-System; English equivalent attached, 1998, 332 pages.
Walter, Affidavit Knut Eric Walter, Anlage D39M, EP 1841268, Feb. 17, 2012, 2 pages.
Walter, Early Discussion on Access Protocol for Mobiles in GSM, Knut Erik Walter Statement, Feb. 6, 2012, 2 pages.
Ween et al., GSM Signalling in Prioritised LEOS Environment, Global Telecommunications Conference, 1997. GLOBECOM '97, IEEE, Nov. 1997, pp. 1152-1156.
3rd Generation Partnership Project; Technical Specification Group Radio Access Network; Physical layer procedures (FOO) (3G TS 25.214 version 3.1.0); Dec. 1999.
3rd Generation Partnership Project; Technical Specification Group Radio Access Network; MAC protocol specification (3G TS 25.321 version 3.2.0); Dec. 1999.
3rd Generation Partnership Project; Technical Specification Group Radio Access Network; RRC Protocol Specification (Release 1999); Mar. 2000.

(56) References Cited

OTHER PUBLICATIONS

Third Generation Mobile Communications: The Way Forward for IPR; Industry Reflection Period Report of the UMTS IPR Working Group; Jan. 1999.
3rd Generation Partnership Project; Technical Specification Group Radio Access Network; Medium Access Control (MAC) protocol specification (Release 8); Sep. 2008.
3GPP TSG-RAN Meeting #6; Document (R2-99k28); Nice, France Dec. 13-15, 1999.
Brand et al., "Multiple Access Protocols for Mobile Communications GPRS, UMTS and Beyond", pp. 208-210; Wiley, 2002.
Ravi Chandra et al., "Capabilities Negotiation with BGP-4", Jul. 1997.
CDMA Digital CAI Standard, Cellular System Dual-Mode Mobile Unit—Base Station Compatibility Standard, Draft Revision 0.1, Sep. 11, 1990.
Status Report of WP1, Funchal; PN/Programme Manager A., Feb. 16-20, 1987.
Report of the 9th SIMEG meeting; May 3, 1989.
Record of WP2 Meeting No. 12, Sep. 7-11, 1987.
Report 00-03, Review 4, GSM Action Plan, Jun. 9-12, 1987.
ETSI Draft EN 301 349 v6. 1.0 (Aug. 1998), "Digital cellular telecommunications system (Phase 2+); General Packet Radio Service (GPRS); Mobile Station (MS)-Base Station System (BSS) interface; Radio Link Control/Medium Access control (RLC/MAC) protocol" (GSM 04.60 version 6.1.0 Release 1997), published on Aug. 1998.
Draft ETSI EN 301 349 V6.4.0 (Jul. 1999) Title: Digital Cellular Telecommunications System (Phase 2+) General Packet Radio Service (GPRS); Mobile Station (MS)-Base Station System (BSS) Interface; Radio Link Control/Medium Access Control (RLC/MAC) Protocol (GSM 04.60 Version 6.4.0 Release 1997); Jul. 1999.
ETSI ETR 300-1 Technical Report Terrestrial Trunked Radio (TETRA); Voice plus Data (V+D); Designers' guide; Part 1: Overview, technical description and radio aspects, May 1997.
European ETS Telecommunication Standard 300 507 Fourth Edition Digital cellular telecommunications system (Phase 2); Service accessibility (GSM 02.11), Sep. 1996.
European ETS Telecommunication Standard 300 507Second Edition Digital cellular telecommunications system (Phase 2); Service accessibility (GSM 02.11), Jan. 1996.
European ETS Telecommunication Standard 300-557 Second Edition European digital cellular telecommunications system (Phase 2); Mobile radio interface layer 3 specification (GSM 04.08) Oct. 1995.
European Telecommunication Standard ETS 300 392-2 Radio Equipment and Systems (RES); Trans-European Trunked Radio (TETRA); Voice plus Data (V+D); Part 2: Air Interface (AI), Mar. 1996.
European Telecommunication Standard ETS 300 812 Terrestrial Trunked Radio (TETRA); Security aspects; Subscriber Identity Module to Mobile Equipment (SIM—ME) interface, Nov. 1998.
ETSI-GSM Meeting No. 29, Saarbruecken, GSM Meeting Report (Approved), Jan. 14-18, 1991.
European Telecommunications Standards Institute, ETSI/TC SMG (98) 4, Special Mobile Group, Report of Meeting No. 27 held in Praha Oct. 12-16, 1998.
European Telecommunications Standards Institute, PT SMG Status Report, Meeting No. 27, Praha Oct. 12-16, 1998.
ETSI TS 125 331 V6.16.0, Universal Mobile Telecommunications System (UMTS); Radio Resource Control (RRC); Protocol specification (3GPP TS 25.331 version 6.16.0 Release 6), Jan. 2008.
Steele, Lee and Gould, Chapter 2 (The GSM System) of "GSM, cdmaone, and 3G Systems", Wiley, Mar. 2001.
Update Note released by ESTI/PT 12, Jan. 1991.
GSM 02.11 v7.0.0, Digital cellular telecommunications system (Phase 2+); Service Accessibility (GSM 02.11, version 7.0.0 Release 1998), Oct. 1998.
GSM Technical Specification GSM 04.08 Version 5.3.0, Digital cellular telecommunications system (Phase 2+); Mobile radio interface layer 3 specification (GSM 04.08), Jul. 1996.
Exhibit C: Mar. 1998 GSM Specification; Draft EN (04.60) V2.0.0, Digital cellular telecommunications system (Phase 2+); General Packet Radio Service (GPRS); Mobile Station (MS)—Base Station System (BSS) interface; Radio Link Control/ Medium Access Control (RLC/MAC) protocol (GSM 04.60 version 2.0.0), Mar. 1998.
GSM 04.60 V6.2.0 (Oct. 1998) Digital cellular telecommunications system (Phase 2+); General Packet Radio Service (GPRS); The mobile station (MS)—Base Station System (BSS) interface; Radio Link Control / Medium Access control (RLC / MAC) protocol (GSM 04.60 version 6.2.0 Release 1997), Oct. 1998.
"A Proposal Forthe Design of the Random Access Protocol on the CCCH", GSM/L1EG, Stockholm, Aug. 31, 1987-Sep. 2, 1987. (Handwritten).
Minutes from the Heads of Delegation Meeting, Munich, Jun. 10, 1987.
Access control to PLMN in state of emergency, GSM 02.11/6, Version: 3.0.0, Expert Group Meeting, May 1989.
Special Mobile Group, GSM/UMTS 01.00, Draft 0.8 of Version 7, Working Procedures for SMG and PT SMG, Feb. 1999.
Peter McGuiggan, "GPRS in Practice: A Companion to the Specifications" pp. 176-182, Wiley, Sep. 2004.
Exhibit J, Message Submission and Relay, May 8, 1997.
Mouly and Pautet, "The GSM System for Mobile Communications" pp. 368-372 and 427, Dec. 1992.
Mouly and Pautet, "The GSM System for Mobile Communications" pp. 7-9 and 11-15, Dec. 1992.
Mouly and Pautet, "The GSM System for Mobile Communications" pp. 7, 9, 11, 13, 15, 17, 19, 21, Dec. 1992.
Mouly and Pautet, "The GSM System for Mobile Communications" pp. 11-15, 368-372 and 427, Dec. 1992.
Association of Radio Industries and Business (ARIB), Integrated Dispatch Radio System, ARIB Standard, RCR STD-32A, Fascicle 1, Issued: Mar. 7, 1993; Revised: Nov. 15, 1995.
Association of Radio Industries and Business (ARIB), Personal Digital Cellular Telecommunication System, ARIB Standard, RCR STD-27 G, Fascicle 1, Issued: Apr. 30, 1991; Revision G: May 29, 1998.
Sony International GmbH, "RACH Prioiritisation Scheme for Multi-Service Provision", ETSI UMTS L23 Expert Group Meeting Oct. 6-9, 1998.
GSM2, "17th Status Report of GSM2", ETSI TC GSM Meeting No. 29, Saarbrucken, Jan. 14-18, 1991.
GSM2, Editorial Corrections, Jan. 10, 1991.
3GPP S2.01 v0.0.1, Radio Interface Protocol Architecture, Jan. 1999.
SMG2 WPA, Agenda Item: 6.2, ETSI SMG#27 Plenary meeting, Prague, Oct. 12-16, 1998.

* cited by examiner

METHOD OF ALLOCATING ACCESS RIGHTS TO A TELECOMMUNICATIONS CHANNEL TO SUBSCRIBER STATIONS OF A TELECOMMUNICATIONS NETWORK AND SUBSCRIBER STATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

The invention is based on a method of controlling or administering access to a telecommunications channel for a subscriber station.

From German Patent Application Serial No. 19838832.2, not yet published by the priority date of the present application, a method for controlling access to a telecommunications channel of a telecommunications network for at least one subscriber station of the telecommunications network is known in which information signals are transmitted to the at least one subscriber station.

SUMMARY OF THE INVENTION

The method of the invention and the subscriber station of the invention have the advantage over the prior art that with the information signals, access authorization data are transmitted to the at least one subscriber station; that upon reception of the access authorization data in an evaluation unit of the at least one subscriber station, the question is asked whether the access authorization data include an access threshold value, and the access threshold value is compared with a random number or a pseudo-random number; and that the right of access to a telecommunications channel of the at least one subscriber station is granted as a function on the outcome of comparison, preferably on the condition that the random number or the pseudo-random number is greater than or equal to the access threshold value. In this way, a random distribution of the access authorization to this telecommunications channel for one or more subscriber stations can be achieved. This access control takes up a minimum of transmission capacity for transmitting the information signals, since it is effected merely by transmitting the access threshold value.

By the provisions recited in the dependent claims, advantageous refinements of and improvements to the method defined by independent claim 1 are possible.

It is especially advantageous that in the evaluation unit of the at least one subscriber station, the question is asked whether the access authorization data include access authorization information with access class information for at least one predetermined user class, in which case, and on the condition that the at least one subscriber station is assigned to the at least one predetermined user class, to which access to a telecommunications channel of the at least one subscriber station is granted as a function of the access class information for this user class. In this way, subscriber stations of a predetermined user class are allowed to use the telecommunications channel even whenever, on the basis of the random distribution by means of the access threshold value are not authorized access to this telecommunications channel. For instance, subscriber stations of emergency services, such as the police or fire department are assigned to a predetermined user class of this kind and can then access the telecommunications channel with priority by means of appropriate access threshold value ink, independently of the random distribution.

A further advantage is that in the evaluation unit of the at least one subscriber station, the question is asked whether the access authorization data include priority information in the form of priority threshold value, in which case and on the condition that the at least one subscriber station is assigned to a pk with a priority value, the priority value is compared with the priority threshold value, and the access to a telecommunications channel of the at least one subscriber station is granted as a function of the outcome of the comparison, preferably on the condition that the priority value is greater than or equal to the priority threshold value. In this way, among the subscriber stations randomly authorized to access this telecommunications channel, a further selection is additionally made, which prefers subscriber stations of higher priority for the access to this telecommunications channel. In this way again, subscriber stations of emergency services such as the police or fire department are given priority, although as a function of the random distribution by means of the access threshold value.

A further advantage is that in the evaluation unit of the at least one subscriber station, the question is asked whether the access authorization data include telecommunications service information, which for telecommunications services offered by the telecommunications network indicate whether the access to at least one telecommunications channel for requesting such a telecommunications service is enabled. For each of the user classes authorized access by the above-cited criteria, it is additionally defined which telecommunications services can be requested via the telecommunications channel. In this way, once again transmission capacity for transmitting the information signals is saved, since different telecommunications services need not be requested by various user classes—in accordance with the above criteria—that are authorized access; instead, for each of these preselected subscriber stations, only the specified telecommunications services can be requested via this telecommunications channel. Thus only minimal service information has to be transmitted along with the information signals.

Another advantage is that in the evaluation unit of the at least one subscriber station, the question is asked whether the access authorization data include an item of access information which indicates whether the access authorization data include either an access threshold value or access channel information, and that the access authorization data are evaluated in accordance with the answer to the question in the at least one subscriber station. In this way, the requisite transmission capacity for transmitting the information signals can be reduced still further, because the access authorization ink include either only the access threshold value or only the access channel information, but not both together.

Still another advantage is that the access to this telecommunications channel of the at least one subscriber station is enabled as a function of the incidence of message traffic on at least one telecommunications channel. In this way, an optimal distribution of the telecommunications channel resources to the subscriber stations can be attained, with the best possible utilization of the transmission capacity.

BRIEF DESCRIPTION OF THE DRAWINGS

Exemplary embodiments of the invention are shown in the drawing and explained in further detail in the ensuing description.

FIG. 2a shows a first bit pattern for granting access to a telecommunications channel;

DESCRIPTION OF THE PREFERRED EMBODIMENTS

Figure 1:
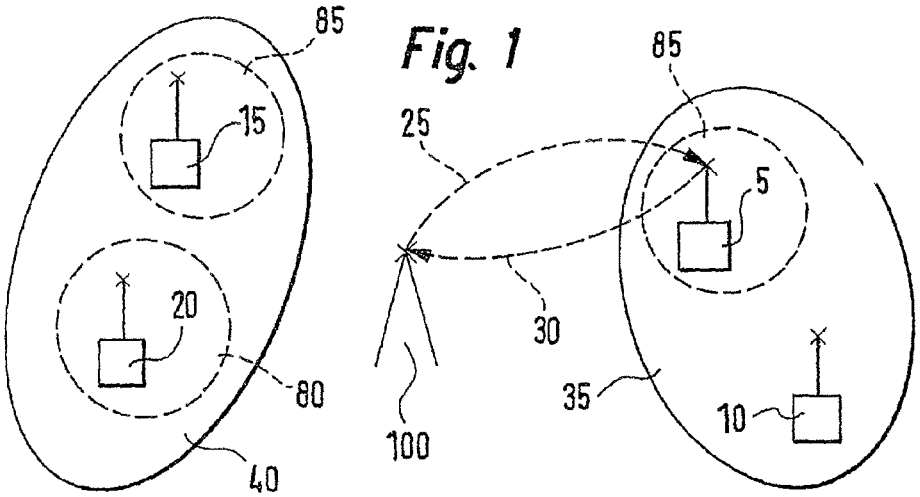
FIG. 1 shows a detail of a telecommunications channel.

In FIG. 1, reference numeral 100 indicates a base station of a telecommunications network embodied as a mobile radio network. Such a mobile radio network is normally constructed as a cellular system, and each radio cell of the mobile radio network is supplied from one base station. The base station 100 thus deploys one radio cell in the mobile radio network, in which cell, as shown in FIG. 1, a first subscriber station 5, a second subscriber station 10, a third subscriber station 15 and a fourth subscriber station 20 are disposed. The four subscriber stations 5, 10, 15, 20 are intended to be mobile stations, for instance, such as mobile phones, radio telephones, or the like. In the exemplary embodiment described here, the first subscriber station is accordingly intended to be embodied as a first mobile station, the second subscriber station 5 as a second mobile station, the third subscriber station 15 as a third mobile station, and the fourth subscriber station 20 as a fourth mobile station.

A network operator of the mobile radio network offers a predetermined number of telecommunications services. As examples hereinafter, three different telecommunications services are to be offered by the network operator. As a first telecommunications service, for instance, a service for sending small data packets can be provided, which can be employed by the mobile stations 5, 10, 15, 20 to transmit small data packets to the base station 100 via a nonselective access class 30, which is assumed hereinafter to be embodied as a RACH (random access channel), for example. As a second telecommunications service, a service for sending larger packet data can be provided, in which the RACH 30 can be used by the mobile stations 5, 10, 15, 20 to request separate data channels for packet data transmission. As a third telecommunications service, a service for speech or landline data transmission may for instance be provided, in which the RACH 30 can be used by the mobile stations 5, 10, 15, 20 to initiate or continue speech and/or data transmissions.

The three telecommunications services can be permitted individually and/or in arbitrary combination to the mobile stations 5, 10, 15, 20 by the network operator.

The telecommunications services must be requested from the network operator by the applicable mobile station via the base station 100. The telecommunications services are typically requested by the mobile stations 5, 10, 15, 20 or made accessible via the RACH 30. Via the RACH 30, messages can as a rule be sent from a plurality of mobile stations to the base station 100. Hence messages from various mobile stations can collide with one another. The base station 100 therefore confirms messages that have been properly received, by sending appropriate confirmation or acknowledgment ink over another channel, not shown in FIG. 1, such as a paging channel, back to those mobile stations whose messages it has properly received.

For the case where the message from one mobile station on the RACH 30 collides with another message, proper reception of this message does not take place in the base station 100, so that the base station 100 cannot send any confirmation ink back to the applicable mobile station, either. After a predetermined time in which no confirmation ink was received from the base station 100, the mobile station therefore usually re-sends the message to the base station 100 via the r30. This runs the risk of overloading the r30, which thus limits the user-initiated requesting of telecommunications services by the application mobile stations because of its limited transmission capacity.

An overload on the r30 can be avoided by having the network operator restrict access to the RACH in a targeted way for the individual mobile stations 5, 10, 15, 20. The access to the RACH may for instance be permitted only for certain user classes of mobile stations either temporarily or with permanent priority. In the exemplary embodiments described in conjunction with FIG. 1, a first user class 35 is provided, which includes the first mobile station 5 and the second mobile station 10. A second user class 40 is also provided, which includes the third mobile station 15 and the fourth mobile station 20. However, it can also be provided that each mobile station be provided with its own user class. User classes with different numbers of mobile stations can also be provided. It is furthermore possible to provide more than one mobile station in one user class. The network operator can now enable access to the RACH by the individual mobile stations as a function of their membership in one of the two user classes 35, 40. This means that the two mobile stations 5, 10 of the first user class 35 are granted equal rights for transmitting on the RACH. Analogously, the mobile stations 15, 20 of the second user class 40 can be granted equal rights for transmitting on the RACH.

By means of information signals, which are transmitted from the base station 100 to the applicable mobile station 5, 10, 15, 20, the network operator informs the various mobile stations 5, 10, 15, 20 which rights for transmitting on the RACH are granted to the applicable mobile station 5, 10, 15, 20. This will be described below in terms of the granting of rights to transmission on the RACH to the first mobile station 5 of FIG. 1, as an example for all the mobile stations 5, 10, 15, 20.

At predetermined times, the base station 100 transmits information signals to the first mobile station 5. The information signals can be transmitted, as shown in FIG. 1, via a signaling channel 25, hereinafter embodied as an example as a broadcast control channel or BCCH. With each of the information signals at the predetermined times, one bit pattern is transmitted to the first mobile station 5. In a first embodiment, the bit pattern can contain ink telling for what purpose access to the RACH is allowed, and which mobile stations are allowed access.

Among the possible purposes for access are for instance the cases already described above, such as sending small data packets, requesting a channel for larger packet data, and requesting a channel for speech/data services.

Another possible purpose for access, however, is sending signaling information from the subscriber station to the base station, ink which serves to maintain and/or modify already existing connections.

Since the bit pattern sent from the base station is sent not only to the first mobile station 5 but also to all the other mobile stations 10, 15, 20, and likewise over the signaling channel 25, which as described is embodied as a BCCH, that is, a point-to-multiple-point channel, so that all the mobile stations receive the same ink at the same time, the bit pattern includes the access rights granted to each user class 35, 40, for the sake of informing the mobile stations of the RACH access rights they have been allowed.

Figure 2:
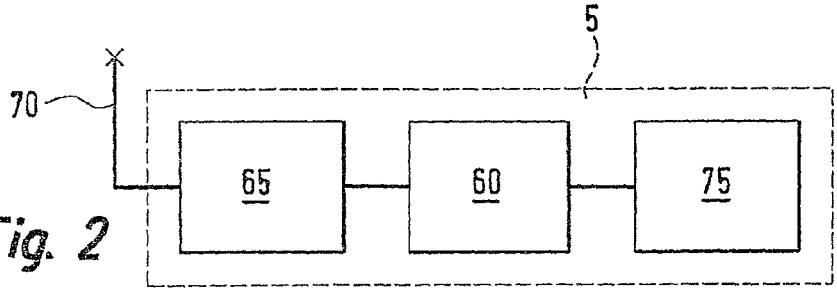
FIG. 2 shows a block circuit diagram of a subscriber station of the invention.

A random distribution of the access authorization on the r30 over some of the mobile stations 5, 10, 15, 20 is attained in that an access threshold value S is sent over the BCCH. In FIG. 2, a block circuit diagram of the first mobile station 5 is shown as an example. The first mobile station 5 includes one transceiver unit 65 with one transmitting/receiving antenna 70. The transceiver unit 65 is also connected to an evaluation unit 60, which accesses an access authorization card 75, such as a SIM card (subscriber identity module card). In FIG. 2, only the elements of the first mobile station 5 that are necessary to describe the invention are shown. The method of the invention will be described below in terms of the first mobile station 5 as an example, but the second mobile station 10, third mobile station 15 and fourth mobile station 20 have the same construction described in conjunction with FIG. 2. The first mobile station 5, by means of its transceiver unit 65, receives the information signals, which include the access threshold value S, that were transmitted over the BCCH 25. The access threshold value S is delivered to the evaluation unit 60. Before each access to the RACH 30 by the first mobile station 5, the evaluation unit 60 draws a random or pseudo-random number R and asks whether the random or pseudo-random number R is at least as great as the access threshold value S. Only then is an access to the r30 allowed. For instance, the access threshold value S is from the interval {0, 1, . . . , n+1}, and the random or pseudo-random number R is from the interval {0, 1, . . . n1}. As a result, the use of the r30 with the access threshold value S=n+1 can be restricted for all the mobile stations 5, 10, 15, 20; that is, the access to the r30 can be prevented. If the random or pseudo-random number R is drawn from the corresponding interval {0, 1, . . . , n} by means of a uniformly distributed random function, then the probability of access to the r30 is the same for all the mobile stations 5, 10, 15, 20.

Figure 3A:
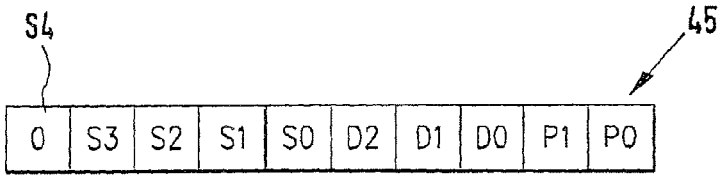
FIG. 3b shows a second bit pattern for granting access to a telecommunications channel.
FIG. 3c shows a third bit pattern for granting access to a telecommunications channel.

A first exemplary embodiment will now be described in conjunction with FIGS. 3a and 3b. Access authorization data 45, 50, 55 are embodied, in the first exemplary embodiment and in further exemplary embodiment, as bit patterns; the access authorization data 45, 50, 55 are transmitted along with the information signals to the mobile stations 5, 10, 15, 20, and the access authorization data 45, 50, 55 include the ink about the rights to using the r30. In the first exemplary embodiment, information signals are transmitted to each mobile station 5, 10, 15, 20 and each information signal includes one bit pattern, comprising 10 bits. A first bit is an evaluation bit S4. FIG. 3a shows the case where the evaluation bit S4=0. The second bit is then a first access threshold value bit S3; the third bit is a second access threshold value bit S2; the fourth bit is a third access threshold value bit S1; and the fifth bit is a fourth access threshold value bit S0. With the four access threshold value bits S3, S2, S1, S0, in this example 24=16 access threshold values S are transmitted by the network operator to the mobile stations 5, 10, 15, 20; via the BCCH 25, the same access threshold value S is transmitted to all the mobile stations 5, 10, 15, 20. Depending on the current incidence of message traffic in the telecommunications network, the access threshold value S can be set higher or lower, that is, can be changed or adapted. For 16 possible access threshold values S, a maximum of 16 access channels for the mobile stations 5, 10, 15, 20 can be bundled together; the membership of a mobile station 5, 10, 15, 20 in one of the 16 access classes depends on the drawing of one of 16 random or pseudo-random numbers R in the applicable evaluation unit of the mobile station 5, 10, 15, 20 and thus can change each time a new draw is done. The sixth bit in the first bit pattern 45 is a first telecommunications service bit D2; the seventh bit is a second telecommunications service bit D1, and the eighth bit is a third telecommunications service bit D0. The first telecommunications service bit D2 indicates whether the first telecommunications service can be utilized; the second telecommunications service bit D1 indicates whether the second telecommunications service can be used; and the third telecommunications service bit D0 indicates whether the third telecommunications service can be used. It can be agreed upon that a telecommunications service is usable whenever the associated telecommunications service bit is set.

The bits 5, 10, 15, 20 can additionally be assigned to so-called priority channels 80, 85. In FIG. 1, the fourth mobile station 20 is assigned to class pd 80. In FIG. 1, the first mobile station 5 and the third mobile station 15 are assigned to a second pk 85. The second mobile station 10 in FIG. 1 is not assigned to any pk. The ninth bit of the first bit pattern 45 is a first priority bit P1, and the tenth bit of the first bit pattern 45 is a second priority bit p). Thus via the first bit pattern 45, a priority threshold value P with four different values can be transmitted to the mobile stations 5, 10, 15, 20. Therefore a maximum of four priority channels, each of different priority, can be distinguished from one another by the priority threshold value P. In FIG. 1, only two of the four possible priority channels of FIG. 3a are shown. The first pk 80 could for instance be a pk for emergency services such as the police or fire department, and could have the highest priority value 4. The second pk 85 could for instance be a pk for a city energy provider, with a somewhat lower priority value 3. If a mobile station 5, 10, 15, 20 belongs to a pk, then the associated priority value is stored in memory on the access authorization card 75 and can be detected there by the evaluation unit 60. Of the mobile stations 5, 10, 15, 20 that draw a random or pseudo-random number 4 that is greater than or equal to the access threshold value S, then only those whose priority value is also greater than or equal to the priority threshold value P then gain authorization for access to the r30. In the case of the second mobile station 10, which is not assigned to any pk, it can be provided that its evaluation unit draws one random or pseudo-random priority value from the four possible priority values and compares the priority value it has drawn with the priority threshold value P transmitted, and gains authorization for access to the r30 if the random or pseudo-random priority value is greater than or equal to the priority threshold value P. This is on the condition that the random or pseudo-random number R drawn by the evaluation unit of the second mobile station 10 is also greater than or equal to the access threshold value S. However, it can also be provided that the mobile stations that do not belong to any pk need not perform any comparison with the priority threshold value P, but instead merely have to draw a random or pseudo-random number R that is greater than or equal to the access threshold value S, in order to be allowed access to the r30. A mobile station is not assigned to any pk whenever there is no priority value stored in memory on the inserted access authorization card 75.

It can also be provided that a predetermined priority value that corresponds to one of the four possible priority values is stored in a memory of the evaluation unit. If the evaluation unit 60 does not detect any priority value on the access authorization card 75, it can use the predetermined priority value for comparison with the priority threshold value P as described.

Figure 3B:
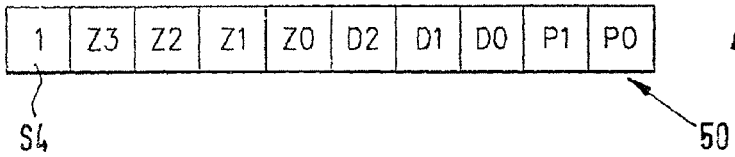

In FIG. 3b, a second bit pattern 50 is shown, again with a bit length of 10 bits; the layout of the second bit pattern 50 matches that of the first bit pattern 45, with the exception that the evaluation bit S4 is set to 1, and therefore the second bit, third bit, fourth bit and fifth bit of the second bit pattern 50 are no longer defined as threshold value bits but rather as access class bits. Thus the second bit of the second bit pattern 50 is a first access class bit Z3; the third bit of the second bit pattern 50 is a second access class bit Z2; the fourth bit of the second bit pattern 50 is a third access class bit Z1; and the fifth bit of the second bit pattern 50 is a fourth access class bit Z0. The first access class bit Z3 stand for the first user class 35; the second access class bit Z2 stands for the second user class 40; the third access class bit Z1 stands for a third user class, not shown in FIG. 1; and the fourth access class bit Z0 stands for a fourth user class, again not shown in FIG. 1. The access class bits as a whole are also called access class ink.

In FIG. 1, all the mobile stations 5, 10, 15, 20 are assigned to the first user class 3 or the second user class 40. However, they can also be assigned to the third user class or the fourth user class, or not to any user class. If an access class bit in the second bit pattern 50 has the value 0, or in other words is not set, then all the mobile stations of the associated user class can access the r30.

If an access class bit of the second bit pattern 50 is set to 1, then no mobile station of the associated user class can access the r30.

All the mobile stations that are allowed to access the r30 can use those telecommunications services whose associated telecommunications service bits in the first bit pattern 45 or the second bit pattern 50 are set.

It can also be provided that a predetermined priority value, which corresponds to one of the four possible priority values, is stored in a memory of the evaluation unit. If the evaluation unit 60 finds no priority value on the access authorization card 75, then it can use the predetermined priority value for comparison with the priority threshold value P, as described.

The membership in a user class is also detected by the evaluation unit of the corresponding mobile station from the access authorization card 75. If no user class is stored in memory on the car, then the evaluation unit of the corresponding mobile station recognizes that this mobile station does not belong to any user class.

If the evaluation bit S4 is set to 1, no access to the r30 is possible for mobile stations that do not belong to any user class.

Below an example will be described for a bit pattern whose bit length is 10 bits and which is transmitted along with the information signal. In this example, the bit sequence "to 0 1000 011 01" is sent to the mobile stations 5, 10, 15, 20 by the base station 100 via the BCCH 25. This means that the mobile stations that are assigned to a user class will be treated like mobile stations that are not assigned to any user class, since the evaluation bit S4 is not set. The access threshold value S is encoded in binary form by means of the access threshold value bits S3, S2, S1, S0, and the priority threshold value P is encoded in binary form by the priority bits P1, P0. For the access threshold value S, a value of 8 thus results, and for the priority threshold value P, a value of 1. If after P and S have been evaluated a mobile station is authorized access, then it is still allowed use of the RACH solely for channel requests for larger packet data services and for speech/data services. Because of the above setting for the service ink, such mobile stations are NOT permitted to use the RACH for sending small data packets.

The second, third, fourth and fifth bits of the first bit pattern 45 and second bit pattern 50 represent access authorization ink, which in the first bit pattern 45 indicates the access threshold value S and in the second bit pattern 50 indicates the authorization of access for the four user classes. The first bit determines whether the second through fifth bits will be interpreted in accordance with the first bit pattern 45 or the second bit pattern 50.

Figure 3C:
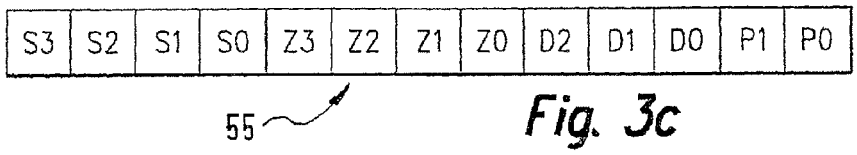

In a second exemplary embodiment, in FIG. 3c a third bit pattern 55 that has a bit length of 13 bits is transmitted along with the information signals from the base station 100 to the mobile stations 5, 10, 15, 20. The third bit pattern 55 has no evaluation bit S4 and therefore includes both the access threshold value bits S3, S2, S1, S0 and the access class bits Z3, Z2, Z1, Z0. In addition, like the first bit pattern 45 and the second bit pattern 50, the third bit pattern 55 includes the telecommunications service bits D2, D1, D0 and the priority bits P1, P0. Mobile stations that belong to a user class for which the associated access channel bit is 0 can access the RACH 30 regardless of the access threshold value S and the priority threshold value P, and thus optionally without their being evaluated in the evaluation unit 60. Both mobile stations that belong to a user class whose associated access channel bit is set to 1 and mobile stations that do not belong to any user class must, in order to ascertain their authorization to access the r30, must perform the access threshold value evaluation already described for the first exemplary embodiment—and optionally the priority threshold value evaluation also described in the first exemplary embodiment. The following bit sequence will be taken as an example: "1000 0110 011 01". This means that an access threshold value S=8 has been selected; that the mobile stations of the first user class 35 and the fourth user class, not shown in FIG. 1, are allowed access to the r30 independently of any evaluation of the access threshold value S and optionally of the priority threshold value P, but the mobile stations of the second user class 40 and the third user class, not shown in FIG. 1, are not allowed to access the r30 without evaluation of the access threshold value S and optionally of the priority threshold value. For the priority threshold value P, a value of 1 results. The access-authorized mobile stations are not allowed to use the RACH to send small data packets, but they are allowed to send channel requests for larger packet services and speech/data services over the RACH. In contrast to the first exemplary embodiment, it is possible in the second exemplary embodiment not only for mobile stations that are allowed access to the r30 by reason of their membership in a user class but also for mobile stations that draw a random or pseudo-random number R that is greater than or equal to the access threshold value S and that optionally have a priority value above the priority threshold value P to access the r30.

In comparison to the first bit pattern and the second bit pattern, in the third bit pattern the access authorization ink includes both the access threshold value bits S3, S2, S1, S0 and the access channel bits Z3, Z2, Z1, Z0.

The numbers of bits used for the access threshold value S, the access channel ink Z0, Z1, Z2, Z3, the priority threshold value P and the telecommunications service ink D0, D1, D2 are understood to be merely examples, and they can also be increased, for example for more-extensive signaling, and reduced, for the sake of bandwidth reduction. In this case, the total length of the bit patterns 45, 50, 55 may change as well. Individual components of the ink can optionally also be omitted entirely.

Figure 4A:
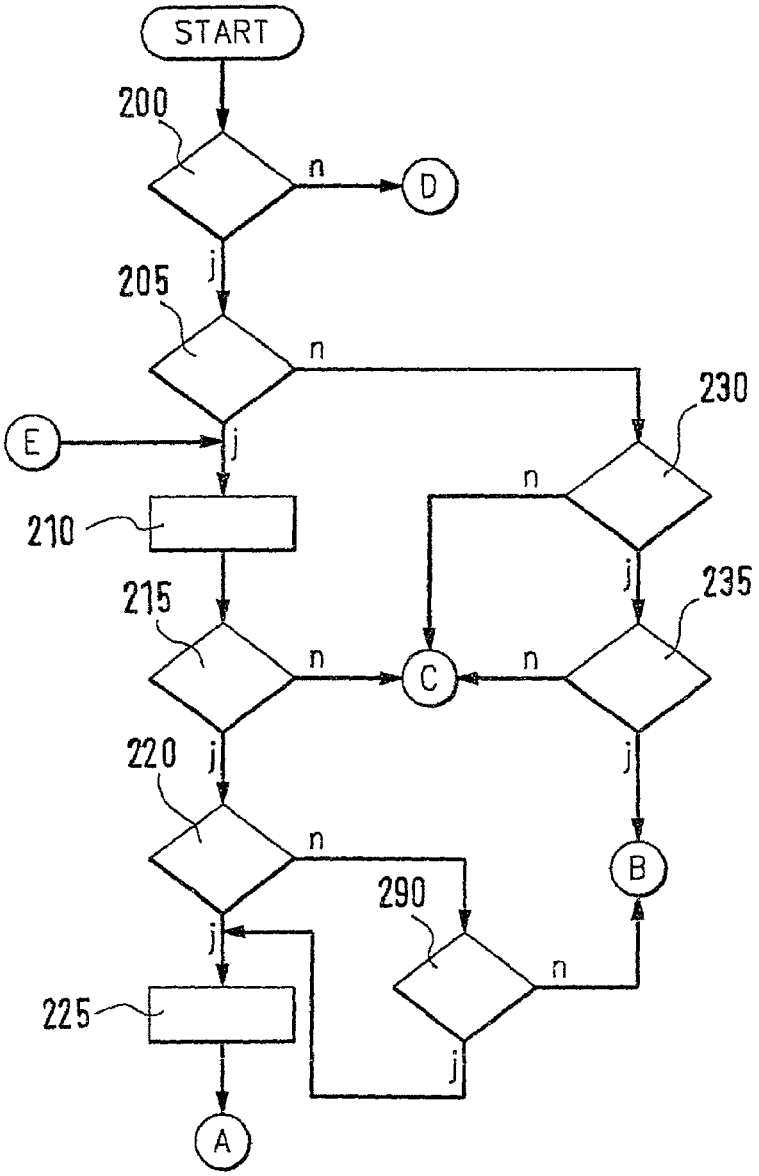
FIGS. 4a, 4b and 4c show a flow chart for the mode of operation of an evaluation unit of the subscriber station of the invention.
Figure 4B:
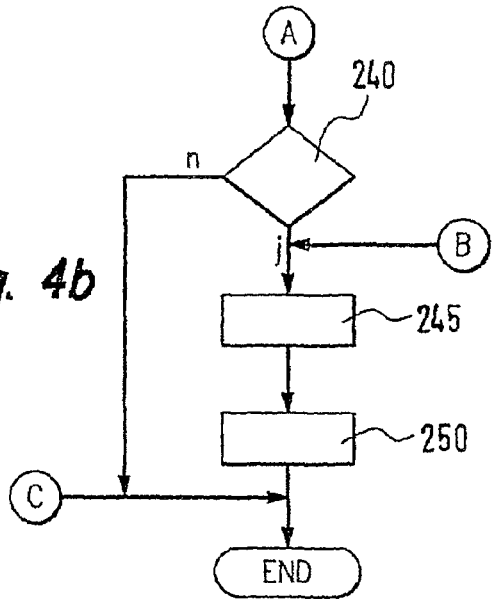
Figure 4C:
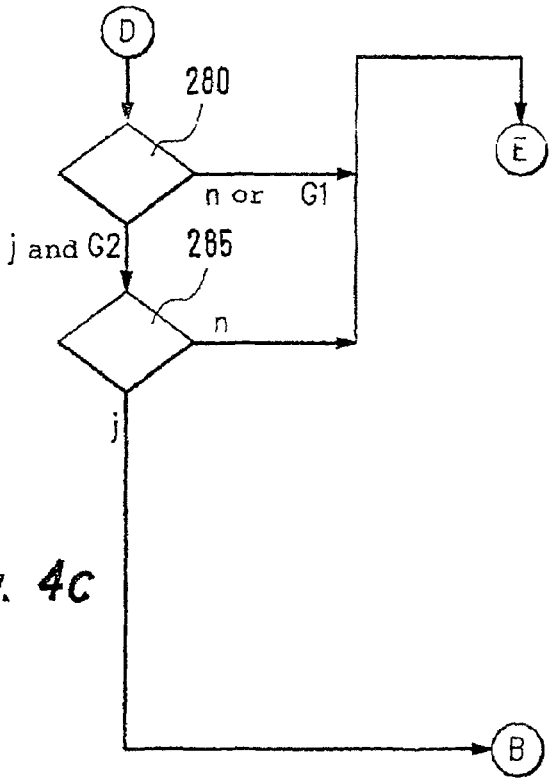

FIGS. 4a, 4b, and 4c show a flow chart for the mode of operation of the evaluation unit 60. At a program point 200, the evaluation unit 60 asks the question whether the information signals received over the BCCH 25 include a bit pattern having the bit length of 10 bits. If so, the next step is a program point 205; if not, the next step is a program point 280. At program point 205, the evaluation unit 60 asks whether the evaluation bit S4=0. If so, the next step is a program point 210; if not, it is a program point 230. At program point 210, from the access threshold values S3, S2, S1, S0, the evaluation unit 60 ascertains the access threshold value S and draws a random or pseudo-random number R from the set of possible access threshold values S; the largest possible access threshold value S can be excepted from the drawing of the random or pseudo-random number R. The next step is a program point 215. At program point 215, the evaluation unit 60 asks whether the random or pseudo-random number R is greater than or equal to the access threshold value S. If so, the next step is a program point 220; if not, an exit is made from the program. At program point 220, the evaluation unit 60 asks whether a priority value of an assigned pk is stored in memory on the access authorization card 75. If so, the next step is a program point 225; if not, it is a program point 290. At program point 290, the evaluation unit 60 asks whether a predetermined priority value is stored in a memory assigned to the evaluation unit. If so, the next step is program point 225; if not, it is a program point 245. At program point 225, the evaluation unit 50 ascertains the priority threshold value P from the bit pattern received. The next step is a program point 240. At program point 240, the evaluation unit 60 asks whether the priority value is greater than or equal to the priority threshold value P. If so, the next step is program point 245; if not, the program is exited. At program point 245, from the telecommunications service bits from the bit pattern, the evaluation unit 60 ascertains what the usable telecommunications services are. The next step is a program point 250. At program point 250, the evaluation unit 60 enables access to the r30 by the associated mobile station for using the usable telecommunications service. Next, the program is exited. At program point 230, the evaluation unit 60 asks whether the membership in a user class is stored in memory on the access authorization card 75. If so, the next step is a program point 235; if not, the program is exited. At program point 235, from the access channel bits, the evaluation unit 60 asks whether the mobile station user class ascertained from the access authorization card 78 is allowed access to the r30. If so, the next step is program point 245; if not, the program is exited. At program point 280, the evaluation unit 60 has detected that a bit pattern with the bit length of 13 bits has been received, and it asks whether a membership of the associated mobile station in a user class is stored in memory on the access authorization card 75. It is also asked, at program point 280, whether the user class belongs to a first group of user classes or to a second group of user classes. The first group of user classes will be referred to hereinafter as normally privileged. The second group of user classes will be referred to hereinafter as preferentially authorized. If it is detected at program point 280 that a membership of the associated mobile station in the preferentially authorized user class exists on the access authorization card 75, then the program moves to program point 285. If not, that is, if no membership of the mobile station in a user class is detected on the access authorization card 75, or if the normally privileged user class is detected, then the program moves to program point 210. If that is the case, the next step is a program point 285, and if not, it is a program point 210. At program point 285, on the basis of the access channel bits at Z3, Z2, Z1, Z0 of the bit pattern received, the evaluation unit 60 asks whether the user class ascertained for the mobile station is authorized access to the r30. If so, the next step is program point 245; if not, it is program point 210.

In all cases where the program is not exited from program point 250, the evaluation unit 50 will have found no allowed access to the r30 for the associated mobile station 5. After the end of the program, the mobile station informs the user that the access to the r30 was not possible, and waits for further inputs from the user. Alternatively, by means of a waiting loop embodied in the mobile station, the program is executed over again, so there is a wait for the next information signal with the next bit pattern, and the information signal is then evaluated to ascertain the ab to the r30.

The information signals are transmitted from the base station 100 to the mobile station 5, 10, 15, 20 are predetermined times, preferably at regular intervals. The network operator can, by the method described, either permit or block access to the RACH as a function of the incidence of message traffic in the telecommunications network and thus as a function of an expected utilization of the r30 for the individual mobile stations 5, 10, 15, 20. Since the incidence of message traffic in the telecommunications network varies over time, the expected utilization of the r30 also varies over time, so that by means of the correspondingly changed bit pattern allocation, access to the RACH is as a rule allocated to the various mobile stations 5, 10, 15, 20 at different times.

A relief of the r30 can additionally be attained by providing a repetition counter and/or a repeat interval. The repetition attempts allowed for re-sending a message from the corresponding mobile station to the base station 100 over the r30, in the event of collision with a message from another mobile station. The repeat interval is a stochastic measure of the time interval until the next repetition of the message sent over the r30 from the applicable mobile station to the base station 100. The lower the number of repeat attempts allowed, and the greater the repeat interval, the greater the relief of the r30. Together with the bit pattern of the access rights granted, the repetition counter and/or the repeat interval can be imparted to the applicable mobile stations at regular time intervals over the associated signaling channel 25, optionally along with other radio-cell-specific ink. The method of the invention can be achieved in a mobile radio network by the UMTS (Universal Mobile Telecommunication System) standard, the GSM standard, or the like.

The method of the invention is not limited to use in a mobile radio network, but instead can be employed generally in telecommunications networks in which there is a telecommunications channel that is used by a plurality of subscriber stations to request telecommunications services and/or to send data packets; the telecommunications network can for instance also be a fixed landline network.

In another version, it can also be provided that for an authorization of access, the prerequisite is a random or pseudo-random number R less than the access threshold value S. Correspondingly, for the priority checking by means of the priority threshold value P, it can be a prerequisite that the random or pseudo-random number R is less than the priority threshold value P.

The invention claimed is:

~~1. A method for allocating rights of access to at least one telecommunications channel usable by a plurality of subscriber stations in common, of a telecommunications network to at least one subscriber station (5, 10, 15, 20) of a telecommunications network, comprising the steps of transmitting information signals to at least one subscriber station (5, 10, 15, 20); transmitting with the information signals, access authorization data (45, 50, 55) to the at least one subscriber station (5, 10, 15, 20); upon reception of the access authorization data (45, 50, 55) in an evaluation unit (6) of the at least one subscriber station (5, 10, 15, 20), asking a question whether the access authorization data (45, 50, 55) include an access threshold value (S), and comparing the access threshold value (S) with a random number or a pseudo-random number (R); and granting a right of access to a telecommunications channel of the at least one subscriber station (5, 10, 15, 20) as a function of an outcome of the comparison.~~

~~2. A method as defined in claim 1; and further comprising granting the right of access as a function of the outcome of comparison on a condition that the random number or the pseudo-random number (R) is greate than or equal to the access threshold value (S).~~

~~3. A method as defined in claim 1; and further comprising transmitting the access information data (45, 50, 55) as bit patterns.~~

~~4. A method as defined in claim 1; and further comprising transmitting the information signals to the at least one subscriber station (5, 10, 150, 20) via at least one signaling channel (25).~~

~~5. A method as defined in claim 1; and further comprising enabling the access to at least one communication channel of the at least one subscriber station (5, 10, 15, 20) as a function of an incidence of message traffic on at east on telecommunication channel.~~

~~6. A method for allocating rights of access to at least one telecommunications channel usable by a plurality of subscriber stations in common, of a telecommunications network to at least one subscriber station (5, 10, 15, 20) of a telecommunications network, comprising the steps of transmitting information signals to at least one subscriber station (5, 10, 15, 20); transmitting with the information signals, access authorization data (45, 50, 55) to the at least one subscriber station (5, 10, 15, 20); upon reception of the access authorization data (45, 50, 55) in an evaluation unit (6) of the at least one subscriber station (5, 10,15, 20), asking a question whether the access authorization data (45, 50, 55) include an access threshold value (S), and comparing the access threshold value (S) with a random number or a pseudo-random number (R); and granting a right of access to a telecommunications channel of the at least one subscriber station (5, 10, 15, 20) as a function of an outcome of the comparison; and further comprising asking in the evaluation unit of the at least one subscriber station (5, 10, 15, 20) a question whether the access authorization data (45, 50, 55) include access authorization Information (S0, S1, S2, S3, S4, Z0, Z1, Z2, Z3) with access class information (Z0, Z1, Z2, Z3) for at least one predetermined user class (35, 40) in which case and on a condition that the at least one subscriber station (5, 10, 15, 20) is assigned to an at least one predetermined user class (35, 40) to which access to at least one telecommunication channel of the at least one subscriber station (5, 10, 15, 20) is granted as a function of the access class information (Z0, Z1, Z2, Z3) for this user class (35, 40).~~

~~7. A method for allocating rights of access to at least one telecommunications channel usable by a plurality of subscriber stations in common, of a telecommunications network to at least one subscriber station (5, 10, 15, 20) of a telecommunications network, comprising the steps of transmitting information signals to at least one subscriber station (5, 10, 15, 20); transmitting with the information signals, access authorization data (45, 50, 55) to the at least one subscriber station (5, 10, 150, 20); upon reception of the access authorization data (45, 50, 55) in an evaluation unit (6) of the at least one subscriber station (5, 10, 15, 20), asking a question whether the access authorization data (45, 50, 55) include an access threshold value (S), and comparing the access threshold value (S) with a random number or a pseudo-random number (R); and granting a right of access to a telecommunications channel of the at least one subscriber station (5, 10, 15, 20) as a function of an outcome of the comparison; and further comprising asking in an evaluation unit (60) of the at least one subscriber station (5, 10, 15, 20) a question whether the access authorization data (4, 50, 55) include priority information in form of a priority threshold value (P), in which case and on a condition that the at least one subscriber station (5, 10, 15, 20) is assigned to a pk (80, 85) with a priority value, comparing the priority value with the priority threshold value (P), and granting an access to a telecommunication channel of the at least one subscriber station (5, 10, 15, 20) as a function of an outcome of the comparison.~~

~~8. A method as defined in claim 7, wherein said granting the access to a telecommunication channel as a function of the outcome of the comparison is performed on a condition that the priority value is greater than or equal to the priority threshold value (P).~~

~~9. A method for allocating rights of access to at least one telecommunications channel usable by a plurality of subscriber stations in common, of a telecommunications network to at least one subscriber station (5, 10, 15, 20) of a telecommunications network, comprising the steps of transmitting information signals to at least one subscriber station (5, 10, 15, 20); transmitting with the information signals, access authorization data (45, 50, 55) to the at least one subscriber station (5, 10, 15, 20); upon reception of the access authorization data (45, 50, 55) in an evaluation unit (6) of the at least one subscriber station (5, 10, 15, 20), asking a question whether the access authorization data (45, 50, 55) include an access threshold value (S), and comparing the access threshold value (S) with a random number or a pseudo-random number (R); and granting a right of access to a telecommunications channel of the at least one subscriber station (5, 10, 15, 20) as a function of an outcome of the comparison; and further comprising asking an evaluation unit (60) of the at least one subscriber station (5, 10, 15, 20) a question whether the access authorization data (45, 50, 55) include telecommunications service information (D0, D1, D2), which for telecommunications services offered by the telecommunications network indicate whether the access to at least one telecommunications channel for use, or a request for such a telecommunications surface is enabled.~~

~~10. A method for allocating rights of access to at least one telecommunications channel usable by a plurality of subscriber stations in common, of a telecommunications network to at least one subscriber station (5, 10, 15, 20) of a telecommunications network, comprising the steps of transmitting information signals to at least one subscriber station~~

~~(5, 10, 15, 20); transmitting with the information signals, access authorization data (45, 50, 55) to the at least one subscriber station (5, 10, 15, 20); upon reception of the access authorization data (45, 50, 55) in an evaluation unit (6) of the at least one subscriber station (5, 10, 15, 20), asking a question whether the access authorization data (45, 50, 55) include an access threshold value (S), aid comparing the access threshold value (S) with a random number or a pseudo-random number (R); and granting a right of access to a telecommunications channel of the at least one subscriber station (5, 10, 15, 20) as a function of an outcome of the comparison; and further comprising asking an evaluation unit (60) of the at least one subscriber station (5, 10, 15, 20) a question whether the access authorization data (45, 50, 55) include an item of access information (S4) which indicates whether the access authorization data (45, 50, 55) are evaluated as an access threshold value (S), as an access channel information (Z0, Z1, Z2, Z3) as a priority threshold value (P), and/or as telecommunications service information (D0, D1, D2).~~

~~11. A method for allocating rights of access to at least one telecommunications channel usable by a plurality of subscriber stations in common, of a telecommunications network to at least one subscriber station (5, 10, 15, 20) of a telecommunications network, comprising tile steps of transmitting information signals to at least one subscriber station (5, 10, 15, 20); transmitting with the information signals, access authorization data (45, 50, 55) to the at least one subscriber station (5, 10, 15, 20); upon reception of the access authorization data (45, 50, 55) in an evaluation unit (6) of the at least one subscriber station (5, 10, 15, 20), asking a question whether the access authorization data (45, 50, 55) include an access threshold value (S), and comparing the access threshold value (S) with a random number or a pseudo-random number (R); and granting a right of access to a telecommunications channel of the at least one subscriber station (5, 10, 15, 20) as a function of an outcome of the comparison; and further comprising asking an evaluation unit (60) of the at least one subscriber station (5, 10, 15, 20) a question whether the access authorization data (45, 50, 55) include an item of access information (S4), which indicates whether the access authorization data (45, 50, 55) include either an access threshold value (S) or access channel information (Z0, Z1, Z2, Z3), and evaluating the access authorization data (45, 50, 55) in accordance with an answer to the question in the at least one subscriber station (5, 10, 15, 20).~~

~~12. A method for allocating rights of access to at least one telecommunications channel usable by a plurality of subscriber stations in common, of a telecommunications network to at least one subscriber station (5, 10, 15, 20) of a telecommunications network, comprising the steps of transmitting information signals to at least one subscriber station (5, 10, 15, 20); transmitting with the information signals, access authorization data (45, 50, 55) to the at least one subscriber station (5, 10, 15, 20); upon reception of the access authorization data (45, 50, 55) in an evaluation unit (6) of the at least one subscriber station (5, 10, 15, 20), asking a question whether the access authorization data (45, 50, 55) include an access threshold value (S), and comparing the access threshold value (S) with a random number or a pseudo-random number (R); and granting a right of access to a telecommunications channel of the at least one subscriber station (5, 10, 15, 20) as a function of an outcome of the comparison: transmitting the access information data (45, 50, 55) as bit patterns; and further comprising providing in the at least one telecommunication channel at least partly a nonselective access class (30).~~

~~13. A subscriber station to which an access to at least one telecommunication channel usable by a plurality of subscriber stations in common can be granted, comprising means for receiving information signals; an evaluation unit (60) for asking when information signals with access authorization data means (65) as authorization data (45, 50, 55) are received, whether the access authorization data (45, 50, 55) include an access threshold value (S) for comparison of the access threshold value (S) with a random number or a pseudo-random number (R), and for ascertaining, as a function of an outcome of a comparison whether an access of the at least one subscriber station (5, 10, 15, 20) to the at least one telecommunications channel is enabled.~~

*14. A method for allocating initial rights of access to a random access channel usable by a plurality of subscriber stations in common, of a telecommunications network to at least one subscriber station of a telecommunications network, comprising the steps of:*

*transmitting information signals to at least one subscriber station;*

*transmitting with the information signals, access authorization data providing an access threshold value and access class information for at least one prescribed privileged user class to the at least one subscriber station;*

*upon reception of the access authorization data in an evaluation unit of the at least one subscriber station, asking a question whether the access authorization data include an access threshold value, and*

*asking a question whether an access authorization card associated with the at least one subscriber station holds an affiliation of the at least one subscriber station to a privileged user class and if so whether initial access to the random access channel is granted to the at least one subscriber station on the basis of the access class information for this privileged user class irrespective of the access threshold value, and*

*having determined that the at least one subscriber station either is not associated with a privileged user class or initial access to the random access channel is not granted to the privileged user class to which the at least one subscriber station is associated on the basis of the access class information irrespective of the access threshold value, comparing the access threshold value with a random number or a pseudo-random number; and*

*granting an initial right of access to a random access channel of the at least one subscriber station as a function of an outcome of the comparison.*

*15. The method as defined in claim 14, further comprising granting the initial right of access as a function of the outcome of comparison on a condition that the random number or the pseudo-random number is greater than or equal to the access threshold value.*

*16. The method as defined in claim 14, further comprising transmitting the access information data as bit patterns.*

*17. The method as defined in claim 14, further comprising transmitting the information signals to the at least one subscriber station via at least one signaling channel.*

*18. The method as defined in claim 14, further comprising enabling the initial access to at least one communication channel of the at least one subscriber station as a function of an incidence of message traffic on at least one telecommunication channel.*

*19. The method of claim 14, wherein the access class information comprises access class bits.*

*20. The method of claim 14, wherein the access class information comprises at least four access class bits, whereby each access class bit indicates whether a respective privileged user class has an initial right of access to the random access channel independent of the received access threshold value bits.*

*21. The method of claim 14, wherein the access authorization data include one of sixteen possible access threshold values.*

*22. A subscriber station to which an initial access to a random access channel usable by a plurality of subscriber stations in common can be granted, comprising:*

*means for receiving information signals;*

*an evaluation unit for asking when information signals with access authorization data comprising access class information for at least one prescribed privileged user class and access threshold value bits conveying an access threshold value are received, whether the access authorization data include an access threshold value for comparison of the access threshold value with a random number or a pseudo-random number, and whether an access authorization card associated with the subscriber station holds an affiliation of the subscriber station to a privileged user class and if so whether initial access to the random access channel is granted to the subscriber station by the access class information for this privileged user class irrespective of the access threshold value, and having determined that the subscriber station is either not associated with a privileged user class or is associated with a privileged user class for which initial access to the random access channel is not granted on the basis of the access class information irrespective of the access threshold value, for comparing the access threshold value with a random number or a pseudo-random number, and for ascertaining, as a function of an outcome of the comparison whether initial access of the subscriber station to the random access channel is enabled.*

*23. The subscriber station of claim 22, wherein the evaluation unit is further arranged to ascertain, as a function of the comparison whether the initial access of the subscriber station to the random access channel is enabled, if the subscriber station is associated with a privileged user class and initial access to the random access channel is not granted to the subscriber station on the basis of the access class information.*

* * * * *